United States Patent
Choi et al.

(10) Patent No.: US 9,491,700 B2
(45) Date of Patent: Nov. 8, 2016

(54) METHOD BY WHICH STATIONS OPERATING IN POWER SAVE MODE IN WIRELESS LAN SYSTEMS TRANSMIT AND RECEIVE FRAMES, AND APPARATUS FOR SUPPORTING SAME

(71) Applicant: LG ELECTRONICS, INC., Seoul (KR)

(72) Inventors: Jinsoo Choi, Anyang-si (KR); Seunghee Han, Anyang-si (KR); Jinsam Kwak, Anyang-si (KR); Yongho Seok, Anyang-si (KR); Jeongki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 14/376,025

(22) PCT Filed: Jan. 30, 2013

(86) PCT No.: PCT/KR2013/000774
§ 371 (c)(1),
(2) Date: Jul. 31, 2014

(87) PCT Pub. No.: WO2013/118996
PCT Pub. Date: Aug. 15, 2013

(65) Prior Publication Data
US 2015/0023236 A1    Jan. 22, 2015

Related U.S. Application Data

(60) Provisional application No. 61/597,171, filed on Feb. 10, 2012, provisional application No. 61/598,337, filed on Feb. 13, 2012.

(51) Int. Cl.
*H04W 52/02* (2009.01)
*H04W 84/12* (2009.01)

(52) U.S. Cl.
CPC ......... *H04W 52/0225* (2013.01); *H04W 84/12* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,058,071 B1* | 6/2006 | Myles | H04W 28/14 370/419 |
| 7,653,041 B2 | 1/2010 | Shih et al. | |
| 7,826,838 B1* | 11/2010 | Nanda | H04W 74/0841 370/465 |
| 8,010,168 B2 | 8/2011 | Benveniste | |
| 2005/0047386 A1* | 3/2005 | Yi | H04W 68/025 370/345 |
| 2006/0034210 A1* | 2/2006 | Chu | H04W 74/0825 370/328 |
| 2007/0281617 A1* | 12/2007 | Meylan | H04W 16/14 455/41.2 |
| 2011/0128900 A1 | 6/2011 | Seok | |

FOREIGN PATENT DOCUMENTS

| | | |
|---|---|---|
| KR | 100741383 B1 | 7/2007 |
| KR | 1020110043497 A | 4/2011 |
| KR | 101099345 B1 | 12/2011 |

* cited by examiner

*Primary Examiner* — Derrick Ferris
*Assistant Examiner* — Jay Vogel
(74) *Attorney, Agent, or Firm* — Dentons US LLP

(57) ABSTRACT

The present invention relates to a method by which a station (STA) which operates in power save mode in a wireless LAN system transmits and receives frames. The method includes the steps of: obtaining a channel access authority on the basis of at least one slot time, wherein each slot time is the unit time when a channel is maintained in an idle state for a channel access by the STA; transmitting a power save (PS) poll frame requesting the transmission of a buffered frame to an access point (AP); and receiving a response frame from the AP in response to the PS poll frame. The length of each slot time is set to be longer than the transmission time of the PS poll frame.

8 Claims, 15 Drawing Sheets

(a)

(b)

(a)

(b)

METHOD BY WHICH STATIONS OPERATING IN POWER SAVE MODE IN WIRELESS LAN SYSTEMS TRANSMIT AND RECEIVE FRAMES, AND APPARATUS FOR SUPPORTING SAME

This application is a National Stage Entry of International Application No. PCT/KR2013/000774 filed Jan. 30, 2013, which claims priority to U.S. Provisional Application Nos. 61/597,171 filed Feb. 10, 2012 and 61/598,337 filed Feb. 13, 2012, all of which are incorporated herein by reference.

BACKGROUND OF THE INVENTION

1. Field of the Invention

The present invention relates to a wireless communication, and more particularly, to a method of transmitting and receiving frames by stations operating in a power save mode in a WLAN system and an apparatus for supporting the same.

2. Related Art

In recent years, with development of information communication technology, various wireless communication technologies have been developed. Among them, a wireless local area network (WLAN) is technology that can wirelessly access the Internet in a home or an enterprise, or a specific service providing area by using a portable terminal a personal digital assistant (PDA), a laptop computer, a portable multimedia player (PMP), or the like based on radio frequency technology.

In order to overcome a limit in communication speed pointed out as a weak point in the WLAN, IEEE 802.11n is provided as a technological standard which has been established comparatively recently. IEEE 802.11n aims at increasing the speed and the reliability of the network and extending an operation distance of the wireless network. In more detail, IEEE 802.11n supports high throughput (HT) in which a data processing speed is maximum 540 Mbps or higher and is based on multiple inputs and multiple outputs (MIMO) technology using multiple antennas in both a transmitting unit and a receiving unit in order to minimize a transmission error and optimize a data speed.

In the wireless LAN system, the station (STA) supports a power save mode. The station operates by entering the doze state to prevent unnecessary power consumption. When there are traffics associated with data which are intended to be transmitted to the STA that operates in the doze state, the access point (AP) may indicate the traffics to the STA. The STA may recognize that the traffics associated with the data which are intended to be transmitted thereto exist and request transmitting the traffics to the AP. The AP may transmit a frame in response to the request from the STA.

Meanwhile, if the AP may transmit only one frame in response to the request by the STA that enters the awake state, it may be inefficient in terms of traffic processing. Further, since an operation of shifting the awake state/doze state is frequent in order for the STA to receive the buffered frame, efficiency may be decreased even in terms of a power save operation. Accordingly, a power save mode operating method is required, which is capable of achieving excellent traffic processing and improving power save mode efficiency of the STA.

Further, when a plurality of STAs associated with one AP is being operated in the power save mode and a relationship between the STAs is a relationship between hidden nodes, the STAs independently attempts a channel access in order to request transmitting buffered frames thereof, and as a result, a collision between requests by each STA may occur. Therefore, a frame transceiving method capable of solving the problem is required.

SUMMARY OF THE INVENTION

An object of the present invention is to provide a method of transmitting and receiving a frame by a station operating in a power save mode in a WLAN system and an apparatus supporting the same.

In an aspect, a method of transmitting and receiving a frame performed by a station (STA) in a power save mode in a WLAN system is provided. The method includes acquiring a channel access authority based on at least one slot time, in which each slot time is a unit time when a channel is kept in an idle state for channel access of the STA, transmitting a power save poll frame requesting the transmission of the buffered frame to an access point (AP), and receiving a response frame from the AP in response to the PS-poll frame. A length of each slot time may be set to be larger than a transmission time of the PS-poll frame.

The method may further include setting a back-off timer which is the number of at least one slot time.

The method may further include receiving a traffic indication map (TIM) element. The TIM element may include a bitmap sequence. A specific bit of the bitmap sequence may indicate whether the buffered frame for the STA exists.

A value of the back-off timer may be determined based on an order in the bitmap sequence of the specific bit.

A value of the back-off timer may be determined based on an order in the bitmap sequence of the specific bit and a time when the STA sets the back-off timer.

The value of the back-off timer may be determined by the order of the specific bit among one or more bits indicating that the buffered frame for the specific STA in the bitmap sequence exists.

The value of the back-off timer may be determined by the order of the specific bit among one or more bits indicating that the buffered frame for the specific STA in the bitmap sequence exists and the time of setting the back-off timer.

The response frame may be the buffered frame.

The response frame may be an acknowledgement (ACK) frame.

In accordance with another aspect of the present invention, there is provided a wireless apparatus that operates in a power save mode in a WLAN system. The wireless apparatus includes: a transceiver which transmits and receives a radio signal; and a processor which operates in functional association with the transceiver. The processor may acquire a channel access authority based on at least one slot time, in which each slot time is a unit time when a channel is kept in an idle state for channel access of the STA, transmit a power save poll frame requesting the transmission of the buffered frame to an access point (AP), and receive a response frame from the AP in response to the PS-poll frame. A length of each slot time may be set to be larger than a transmission time of the PS-poll frame.

According to a frame transceiving method proposed in the present invention, the length of a slot time which is a unit time to verify whether a channel is in an idle state is larger than a time when a PS-poll frame is transmitted by the STA in order for the STA to access the channel. Therefore, STAs having a hidden node relationship access the channel simultaneously or during a time interval of overlapping through contention to transmit the PS-poll frame, thereby preventing a collision.

Further, according to the proposed method for transmitting and receiving frame, an initial back-off timer value set by each of the STAs that intend to access the channel can be uniquely set. Therefore, it is possible to prevent the respective STAs from accessing the channel.

A collision of frame transmission by the STAs having the hidden node relationship is prevented and the STAs are prevented from accessing the channel simultaneously or during an overlapping interval to prevent a radio medium from being unnecessarily occupied. Therefore, the frame can be efficiently transmitted and received to improve processing rate throughout a wireless LAN.

DESCRIPTION OF EXEMPLARY EMBODIMENTS

Figure 1:
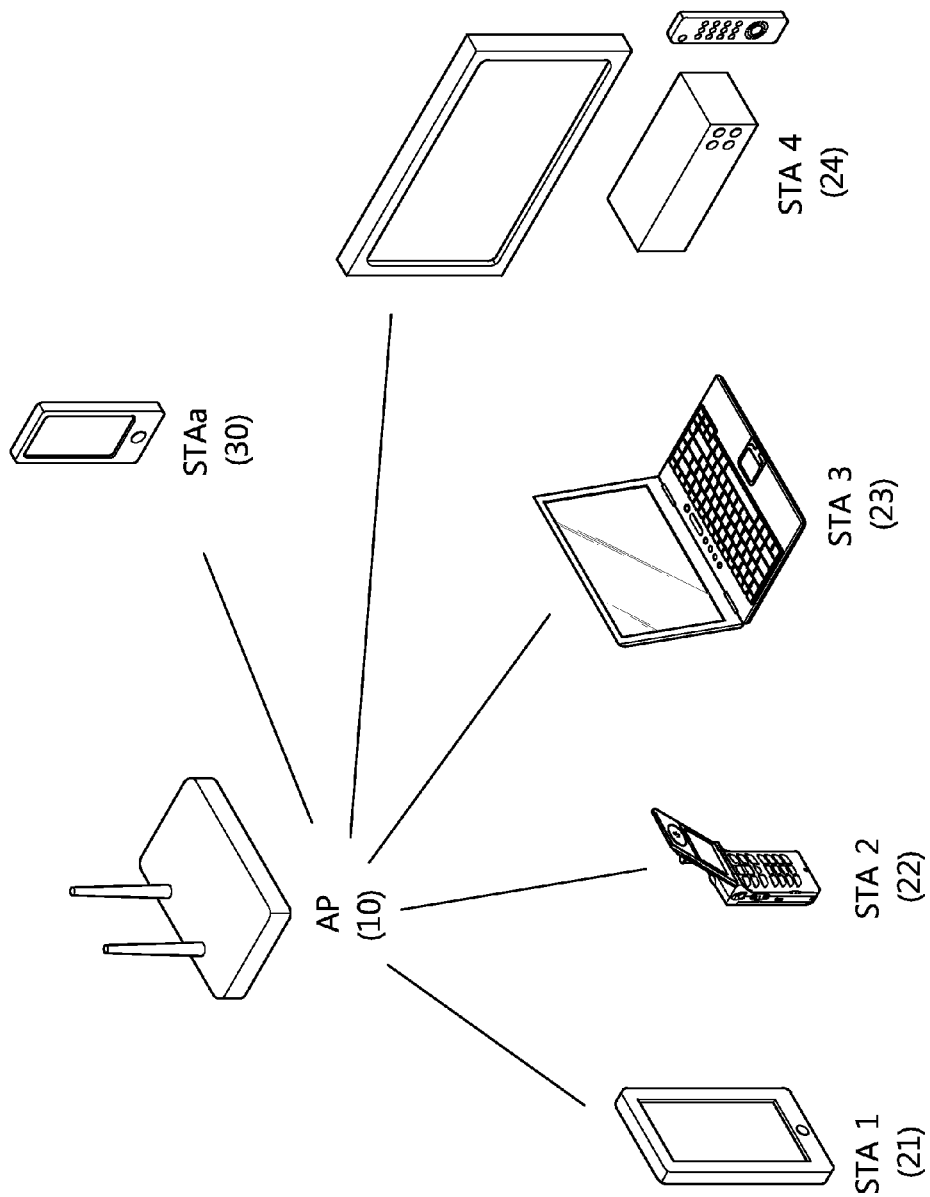
FIG. 1 is a diagram illustrating a configuration of a general wireless local area network (WLAN) according to an exemplary embodiment of the present invention.

FIG. 1 is a diagram illustrating a configuration of a general wireless local area network (WLAN) according to an exemplary embodiment of the present invention.

Referring to FIG. 1, the WLAN system includes one or more basic service sets (BSSs). The BSS, as a set of stations (STAs) that are successfully synchronized to communicate with each other, is not a concept that indicates a specific area.

An infrastructure BSS includes one or more non-AP stations (a non-APSTA1 21, a non-APSTA2 22, a non-APSTA3 23, a non-AP STA4 24, and a non-AP STAa 30), an access point (AP) 10, and a distribution system (DS) that connects a plurality of APs. In the infrastructure BSS, the AP manages the non-AP STAs of the BSS.

On the contrary, an independent BSS (IBSS) is a BSS that operates in an Ad-Hoc mode. Since the IBSS does not include the AP, there is no centralized management entity that performs a management function at the center. That is, in the IBSS, the non-AP STAs are managed by a distributed manner. In the IBSS, all the STAs may be constituted by movable STAs, and are not permitted to access the DS to constitute a self-contained network.

The STA, as a predetermined functional medium that includes a medium access control (MAC) following a regulation of an Institute of Electrical and Electronics Engineers (IEEE) 802.11 standard and a physical layer interface for a wireless medium, widely includes all of the APs and the non-AP stations.

The non-AP STA, as not the AP but the STA, may be called a mobile terminal, a wireless device, a wireless transmit/receive unit (WTRU), user equipment (UE), a mobile station (MS), a mobile subscriber unit, or simply even another name such as a user. Hereinafter, the non-AP STA will be designated as the STA for convenience of the description.

The AP is a functional entity that provides an access to the DS via the wireless medium for the STA associated to the corresponding AP. In the infrastructure BSS including the AP, there is a principle that the communication among the STAs is performed via the AP, but when a direct link is set, the STAs may also directly communicate with each other. The AP may also be called a central controller, a base station (BS), a node-B, a base transceiver system (BTS), a site controller, or a management STA.

A plurality of infrastructure BSSs including the BSS illustrated in FIG. 1 may be connected to each other through the distribution system (DS). The plurality of BSSs connected through the DS is called an extended service set (ESS). The APs and/or STAs included in the ESS may communicate with each other, and in the same ESS, the STA may move from one BSS to another BSS during seamless communication.

In the WLAN system according to IEEE 802.11, a basic access mechanism of a medium access control (MAC) is a carrier sense multiple access with collision avoidance (CSMA/CA) mechanism. The CSMA/CA mechanism is also called a distributed coordination function (DCF) of the IEEE 802.11 MAC, and basically adopts a "listen before talk" access mechanism. According to this type of access mechanism, the AP and/or STA senses the wireless channel or medium before starting transmission. As a sensing result, when it is judged that a medium is in an idle status, frame transmission starts through the corresponding medium. On the contrary, when it is sensed that the medium is in an occupied status, the corresponding AP and/or STA does not start transmission thereof, but waits for the medium access by setting a delay period for the medium access.

The CSMA/CA mechanism also includes virtual carrier sensing in addition to physical carrier sensing in which the AP and/or STA directly senses the medium. The virtual carrier sensing is to complement for a problem which may occurs in terms of the medium access, such as a hidden node problem, or the like. The MAC of the WLAN system uses a network allocation vector (NAV), for the virtual carrier sensing. The NAV is a value in which the AP and/or STA using currently the medium or having an authority to use the medium indicates a time that remains until the medium becomes a usable state to another AP and/or STA. Accordingly, the value set as the NAV corresponds to a period in which the use of the medium is scheduled by the AP and/or STA that transmits the corresponding frame.

An IEEE 802.11 MAC protocol provides a hybrid coordination function (HCF) based on a point coordination function (PCF) in which polling is periodically performed so that all receiving APs and/or STAs may receive a data packet in a synchronous access scheme based on the DCF and polling together with the DCF. The HCF has an enhanced distributed channel access (EDCA) in which an access scheme for a provider to provide the data packet to a plurality of users is based on contention and an HCF controlled channel access (HCCA) using a contention free based channel access scheme using a polling mechanism. The HCF may include a medium access mechanism for improving a quality of service (QoS) of the WLAN, and transmit QoS data in both a contention period (CP) and a contention free period (CFP).

In the WLAN system, two issues related with such a channel access mechanism may be included. A first issue is a hidden node problem, and a second issue is an exposed node problem. Hereinafter, the channel access mechanism related problems and methods of solving the problems will be described in detail with reference to FIGS. 2 and 3.

Figure 2:
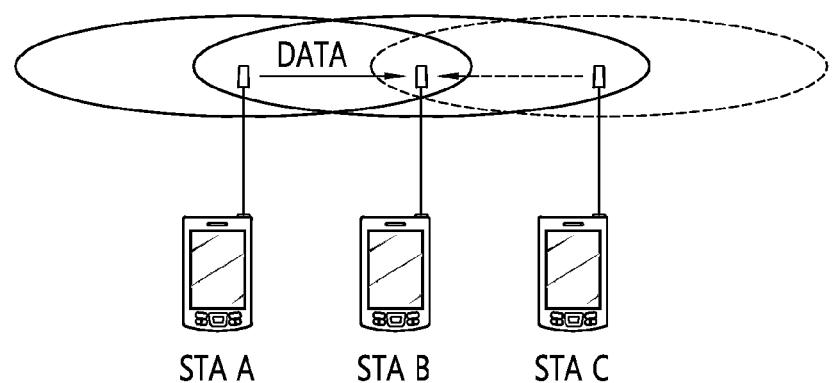
FIG. 2 is a diagram illustrating an example of problems which may exist in the WLAN system.
Figure 2:
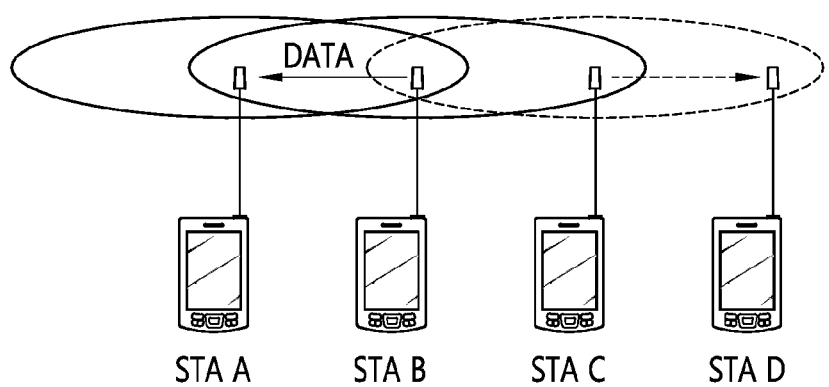

FIG. 2 is a diagram illustrating an example of problems which may exist in the WLAN system.

A sub diagram A of FIG. 2 is a diagram illustrating an example of the hidden node problem.

In the case where the STA A and the STA B are communicating and the STA C has information to be transmitted, the STA A may be in a situation that has access to the channel in order to transmit the information. In the case where signal coverage of each of the STA A and the STA C does not overlap with each other, the STA C may not recognize a channel occupied state by the STA A. In this case, the STA A may determine that the channel is in an idle state through the carrier sensing for the medium. Accordingly, the STA C may access the channel to transmit the wireless signal to the STA B, and this may generate a collision between the wireless signal by the STA A and the wireless signal by the STA C. In such a situation, the STA C may be called a hidden node with respect to the STA A.

A sub diagram B of FIG. 2 is a diagram illustrating an example of the exposed node problem.

The STA B transmits data to the STA A. The STA C has data to be transmitted to the STA D. The STA C may determine that the channel is occupied by the STA B through the carrier sensing. As a result, even though the STA C desires to transmit the data to the STA D, since the STA C determines that the channel is occupied, an unnecessarily waiting situation until the channel is returned to the idle state may occur. That is, even though the STA A is beyond the range of the carrier sensing of the STA C, the data transmission to the STA A disturbs the data transmission to the STA D of the STA C. In such a situation, the STA C becomes an exposed node of the STA B.

In order to prevent the problems that may be generated above, short signaling frames such as request to send (RTS)/clear to send (CTS) may be introduced. This may leave room for overhear whether neighboring STAs transmit the information of two STAs. That is, when an STA that intends to transmit the data transmits an RTS frame to an STA that receives the data, a receiving STA transmits a CTS frame to neighboring UEs to notify that the receiving STA itself receives the data. An example for a method of solving the problem based on the RTS/CTS will be described with reference to FIG. 3.

Figure 3:
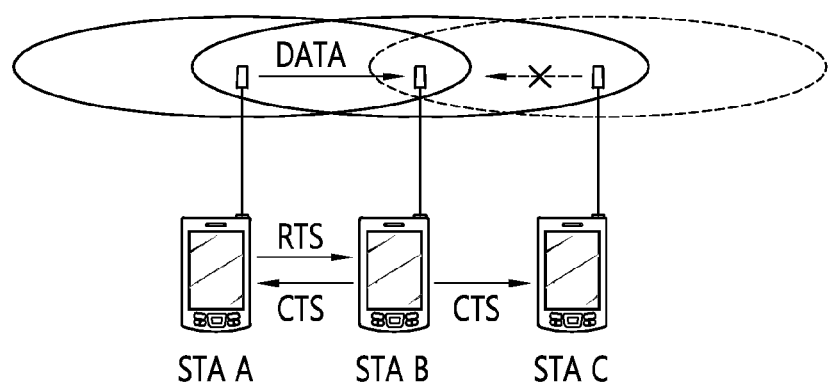
FIG. 3 is a diagram illustrating an example of a method of solving the problems which may exist in the WLAN system.
Figure 3:
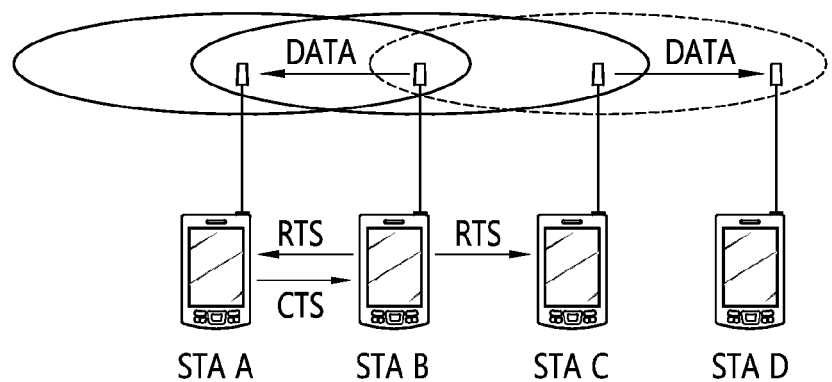

FIG. 3 is a diagram illustrating an example of a method of solving the problems which can exist in the WLAN system.

A sub diagram A of FIG. 3 is a diagram illustrating an example that the RTS/CTS signaling is applied to the hidden node problem.

When the STA A transmits the RTS frame to the STA B, the STA B transmits the CTS frame to both the STA A and the STA C which are positioned therearound. As a result, the STA C may not know that the channel is occupied by the STA A even though the carrier sensing is actually performed, but the STA C may receive the CTS frame to know that the STA B may receive the data through the channel for a predetermined period. As a result, the STA C may not perform an operation of accessing the channel for the corresponding period in order to transmit the data to the STA B, thereby preventing the channel access collision.

A sub diagram B of FIG. 3 is a diagram illustrating an example that the RTS/CTS signaling is applied to the exposed node problem.

The STA A to transmit the data to the STA B transmits the RTS frame to the STA B, and in response, the STA B transmits the CTS frame to both the STA A and the STA C. The STA C may know that the STA B receives the data through the channel by receiving (or overhearing) the CTS frame transmitted from the STA B. However, the STA C may know that the access to the channel in order to transmit the data to the STA D does not cause the collision with the data transmission and reception of the STA A and the STA B. In more detail, the STA C receives the RTS frame from the STA B, but does not receive the CTS frame to be transmitted by the STA A, and as a result, it may be known that the STA A is beyond the range of the carrier sensing of the STA C. Accordingly, the STA C may transmit the data to the STA D.

In a wireless communication system, when power of the STA is turned on and an operation of the STA is started in terms of a characteristic of the wireless medium, existence of a network may not directly be known. Accordingly, even any type of STA should perform a network discovery process in order to access the network. The STA that discovers the network through the network discovery process selects a network which the STA will join through a network selection process. Thereafter, the STA performs a data exchange operation which is performed in a transmitter/receiver by joining the selected network.

In the WLAN system, the network discovery process is implemented by a scanning procedure. The scanning procedure is divided into passive scanning and active scanning. The passive scanning is performed based on a beacon frame which the AP periodically broadcasts. In general, the AP of the WLAN broadcasts the beacon frame every specific interval (for example, 100 msec). The beacon frame includes information on a BSS managed thereby. The STA passively stands by for receiving the beacon frame in a specific channel. The STA that acquires information on the network through receiving the beacon frame ends the scanning procedure in the specific channel. Since the passive scanning is performed only when the STA receives the beacon frame without transmitting a separate frame, overall overhead is small. However, a scanning execution time is increased in proportion to the transmission period of the beacon frame.

In the active scanning, the STA actively broadcasts a probe request frame in the specific channel to request the network information from all APs that receive the broadcasted probe request frame. The AP that receives the probe request frame the network information included in a probe response frame to the corresponding STA after the AP stands by for a random time in order to prevent a frame collision. The STA ends the scanning procedure through acquiring the network information by receiving the probe response frame. The active scanning has an advantage that scanning may be ended within a relatively early time. On the contrary, since a frame sequence depending on a request/a response is required, overall network overhead is increased.

The STA that completes the scanning procedure selects the network according to a specific reference and thereafter, performs an authentication procedure with the AP. The authentication procedure is configured by a 2-way handshake. The STA that completes the authentication procedure performs an association procedure with the AP.

The association procedure is configured by the 2-way handshake. First, the STA transmits an association request frame to the AP. Information on capabilities of the STA is included in the association request frame. The AP determines whether the AP is permitted to be associated with the corresponding STA based on the capabilities information. The AP that determines whether the association is permitted transmits an association response frame to the corresponding STA. The association response frame includes information that indicates whether the association is permitted and information that indicates a reason in a success/failure in the association. The association response frame further includes information on capabilities which may be supported by the AP. When the association is successfully completed, the frame is normally exchanged between the AP and the STA. When the association is failed, an association procedure may be attempted again based on information on the failure reason included in the association response frame or the STA may request the association to other AP.

In order to overcome a limit in communication speed pointed out as a weak point in the WLAN, IEEE 802.11n is provided as a technological standard which has been established comparatively recently. IEEE 802.11n aims at increasing the speed and the reliability of the network and extending an operation distance of the wireless network. In more detail, IEEE 802.11n supports high throughput (HT) in which a data processing speed is maximum 540 Mbps or higher and is based on multiple inputs and multiple outputs (MIMO) technology using multiple antennas in both a transmitting unit and a receiving unit in order to minimize a transmission error and optimize a data speed.

As propagation of the WLAN and further, applications using the WLAN are diversified, the need for a new WLAN system for supporting higher throughput than the data processing speed supported by IEEE 802.11n has been on the rise. A WLAN system that supports very high throughput (VHT) as a next version of the IEEE 802.11n WLAN system is one of IEEE 802.11 WLAN systems that have been newly proposed in recent years in order to support a data processing speed of 1 Gbps or higher for multiple users and throughput of 500 Mbps or more for a single user at an MAC service access point (SAP).

The VHT WLAN system intends to support 80 MHz, contiguous 160 MHz, and non-contiguous 160 MHz bandwidth transmission and/or higher bandwidth transmission as compared with the existing WLAN system that supports 20 MHz and 40 MHz. In addition, the VHT WLAN system supports 256 QAM further than the existing WLAN system that 64 quadrature amplitude modulation (QAM).

Since the VHT WLAN system supports a multi user-multiple input multiple output (MU-MIMO) transmission method for higher throughput, the AP may transmit the data frame simultaneously to one or more STAs which are MIMO-paired. The maximum number of the paired STAs may be 4, and when the maximum number of spatial streams is 8, maximum 4 spatial streams may be allocated.

Referring back to FIG. 1, in the WLAN system illustrated in the figure, the AP 10 may simultaneously transmit data to an STA group including at least one STA of a plurality of STAs 21, 22, 23, 24, and 30 associated therewith. In FIG. 1, it is illustrated that the AP performs MU-MIMO transmission to the STAs, but in a WLAN system that supports a tunneled direct link setup (TDLS), a direct link setup (DLS), or a mesh network, the STA that intends to transmit data may transmit a PPDU to the plurality of STAs by using an MU-MIMO transmission technique. Hereinafter, it will be described as an example that the AP transmits the PPDU to the plurality of STAs according to the MU-MIMO transmission technique.

The data transmitted to the respective STAs may be transmitted through different spatial streams. The data packet transmitted by the AP 10 as the PPDU generated and transmitted in the physical layer of the WLAN system or a data field included in the PPDU may be mentioned as a frame. That is, the PPDU for single user (SU)-MIMO and/or MU-MIMO or the data field included in the PPDU may be an MIMO packet. Among them, the PDDU for the MU-MIMO may be called an MU packet. In the example of the present invention, it is assumed that a STA group as a transmission target MU-MIMO paired with the AP 10 includes a STA1 21, a STA2 22, a STA3 23, and a STA4 24. In this case, since no spatial stream is allocated to a specific STA of the transmission target STA group, the data may not be transmitted to the specific STA. Meanwhile, it is assumed that a STAa 30 is a STA that is associated with the AP, but is not included in the transmission target STA group.

In the WLAN system, an identifier may be allocated to the transmission target STA group for supporting the MU-MIMO transmission, and the identifier is called a group identifier (ID). The AP transmits a group ID management frame including group definition information in order to allocate the group ID to the STAs that support the MU-MIMO transmission, and the group ID is thus allocated to the STAs before the PPDU transmission. A plurality of group IDs may be allocated to one STA.

Table 1 shown below represents information elements included in the group ID management frame.

TABLE 1

| Order | Information |
| --- | --- |
| 1 | Category |
| 2 | VHT action |
| 3 | Membership status |
| 4 | Spatial stream position |

In a category field and a VHT action field, a corresponding frame corresponds to a management frame and is set to identify the group ID management frame used in the next-generation WLAN system that supports the MU-MIMO.

As shown in Table 1, the group definition information includes membership status information that indicates whether the corresponding STA belongs to a specific group ID and spatial stream position information that indicates to which position a spatial stream set of the corresponding STA corresponds in all spatial streams depending on the MU-MIMO transmission when the corresponding STA belongs to the corresponding group ID.

Since one AP manages a plurality of group IDs, the membership status information provided to one STA needs to indicate whether the STA belongs to each of the group IDs managed by the AP. Therefore, the membership status information may exist in an array type of subfields that indicate whether the STA belongs to each group ID. Since the spatial stream position information indicates a position of each group ID, the spatial stream information position may exist in the array type of subfields that indicate positions of spatial stream sets occupied by the STA for the respective group IDs. Further, the membership status information and the spatial stream position information for one group ID may be implemented within one subfield.

The AP transmits the PPDU by including information that indicates the group ID in the PPDU as control information when transmitting the PPDU to the plurality of STAs through the MU-MIMO transmission method. When the STA receives the PPDU, the STA verifies the group ID field to verify whether the STA itself is a member STA of the transmission target STA group. When the STA verifies that the STA itself is the member of the transmission target STA group, the STA may verify at which stream of all spatial streams a spatial stream set transmitted to the STA itself is positioned. Since the PPDU includes information on the number of spatial streams allocated to the receiving STA, the STA finds spatial streams allocated to the STA itself to receive data.

The sensing of the channel at all times for the frame transmission and reception causes continuous power consumption of the STA. Because the power consumption in the receiving state does not have a large difference as compared with the power consumption in the transmitting state, continuously maintaining the receiving state generates relatively large power consumption to the STA operating by a battery. Accordingly, in the WLAN system, since the sensing of the channel while continuously maintaining the reception wait state in the STA may cause inefficient power consumption without a special synergistic effect in terms of a WLAN throughput, the channel sensing may not be suitable in terms of power management.

In order to compensate for the problems, in the WLAN system supports a power management (PM) mode of the STA. The PM mode of the STA is divided into an active mode and a power save (PS) mode. The STA basically operates in the active mode. The STA operating in the active mode keeps an awake state. That is, a normally operable state such as the frame transmission and reception or the channel sensing is kept.

The STA operating in the PS mode operates by shifting a doze state and an awake state. The STA operating in the doze state operates by minimum power and does not receive the wireless signal transmitted from the AP including the data frame. Further, the STA operating in the doze state does not perform the channel sensing.

As the STA operates in the doze state as long as possible, the power consumption is decreased, and as a result, in the STA, an operating period is increased. However, since the frame transmission and reception is impossible in the doze state, the STA may unconditionally operate for a long time. The STA operating in the doze state shifts into the awake state to transmit the frame in the case where the frame to be transmitted to the AP exists. However, in the case where the AP has the frame to be transmitted to the STA operating in the doze state, the STA may not receive the frame and may not know even that the received frame exists. Accordingly, the STA determines whether a frame to be transmitted to the STA exists and if the frame exists, an operation of shifting into the awake state according to a specific cycle may be required in order to receive the frame. As a result, the AP may transmit the frame to the STA. This will be described with reference to FIG. 4.

Figure 4:
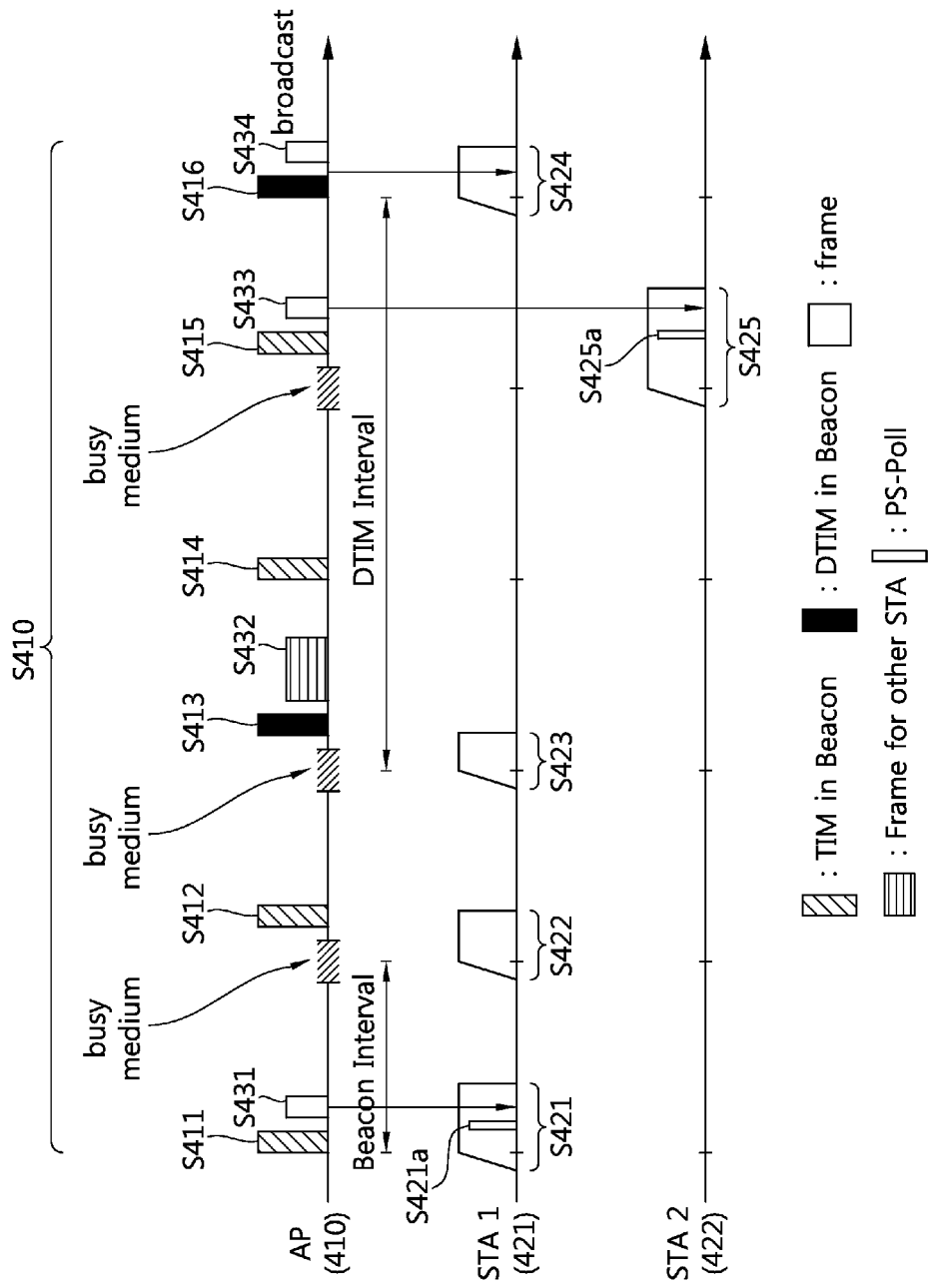
FIG. 4 is a diagram illustrating an example of a power management operation.

FIG. 4 is a diagram illustrating an example of a power management operation.

Referring to FIG. 4, an AP 410 transmits beacon frames to STAs in the BSS at a predetermined period (S410). A traffic indication map (TIM) information element is included in the beacon frame. The TIM information element includes information indicating that bufferable frames or bufferable units (BUs) for the STAs associated with the AP 410 are buffered and the AP 410 will transmit the frames. The TIM element includes a TIM used to notify a unicast frame and a delivery traffic indication map (DTIM) used to notify a multicast or broadcast frame.

The AP 410 transmits the DTIM once whenever the beacon frames are transmitted three times.

A STA1 421 and a STA2 422 are STA operating in a PS mode. The STA1 421 and the STA2 422 shift from the doze state to the awake state every wakeup interval of a predetermined period to be set so as to receive the TIM element transmitted by the AP 410.

The STA1 421 shifts into the awake state every beacon interval to set a predetermined wakeup interval so as to receive the TIM element. Accordingly, the STA1 421 shifts into the awake state (S421) when the AP 410 transmits the first beacon frame (S411). The STA1 421 receives the beacon frame and acquires the TIM element. In the case where the acquired TIM element indicates that the bufferable frame to be transmitted to the STA1 421 is buffered, the STA1 421 transmits a PS-poll frame requesting the frame transmission to the AP 410, to the AP 410 (S421a). The AP 410 transmits a frame corresponding to the PS-poll frame to the STA1 421 (S431). The STA1 421 in which the frame reception is completed shifts again into the doze state to operate.

When the AP 410 transmits the second beacon frame, since the medium is in a busy state such that another apparatus accesses the medium, the AP 410 may not transmit the beacon frame according to an accurate beacon interval, but transmit the beacon frame at a delayed time (S412). In this case, the STA1 421 shifts the operation mode into the awake state according to the beacon interval, but does not receive the transmitted beacon frame due to the delay to shift the operation mode into the doze state again (S422).

When the AP 410 transmits the third beacon frame, the TIM element set as the DTIM may be included in the corresponding beacon frame. However, since the medium is in the busy state, the AP 410 transmits the beacon frame to be delayed (S413). The STA1 421 shifts into the awake state to operate, and may acquire the DTIM through the beacon frame transmitted by the AP 410. Since the DTIM acquired by the STA1 421 indicates that there is no frame to be transmitted to the STA1 421 and there is a frame for another STA, the STA1 421 shifts into the doze state again to operate. The AP 410 transmits the frame to the corresponding STA after transmitting the beacon frame (S432).

The AP 410 transmits the fourth beacon frame (S414). However, since the STA1 421 may not acquire information that a bufferable frame for the STA1 421 itself is buffered through the previous TIM element transmission in twice, the wakeup interval for the TIM element transmission may be adjusted. Further, in the case where signaling information for adjusting a wakeup interval value of the STA1 421 is included in the beacon frame transmitted by the AP 410, the wakeup interval value of the STA1 421 may be adjusted. In the present example, the STA1 421 may be set to shift an operation state for the TIM element transmission every beacon interval into an operation state every three beacon intervals. Accordingly, since the STA1 421 is kept in the doze state at the time when the AP 410 transmits the fourth beacon frame (S414) and transmits the fifth beacon frame (S415), the STA1 421 may not acquire the corresponding TIM element.

When the AP 410 transmits the sixth beacon frame (S416), the STA1 421 shifts into the awake state to operate and acquires the TIM element included in the beacon frame (S424). Since the TIM element is the DTIM indicating that the broadcast frame exists, the STA1 421 does not transmit the PS-poll frame to the AP 410, but receives the broadcast frame transmitted by the AP 410 (S434).

Meanwhile, the wakeup interval set in a STA2 422 may be set at a longer period than the STA1 421. Accordingly, the STA2 422 shifts into the awake state at the time when the AP 410 transmits the fifth beacon frame (S415) to transmit the TIM element (S425). The STA2 422 finds that the frame to be transmitted to the STA2 422 itself through the TIM element exists and transmits the PS-poll frame to the AP 410 in order to request the transmission (S425a). The AP 410 transmits a frame corresponding to the PS-poll frame to the STA2 422 (S433).

In order to operate the power save mode like FIG. 4, a TIM indicating that the frame to be transmitted to the STA itself exists or a DTIM indicating that the broadcast/multicast frame exists is included in the TIM element. The DTIM may be implemented by setting a field of the TIM element.

Figure 5:
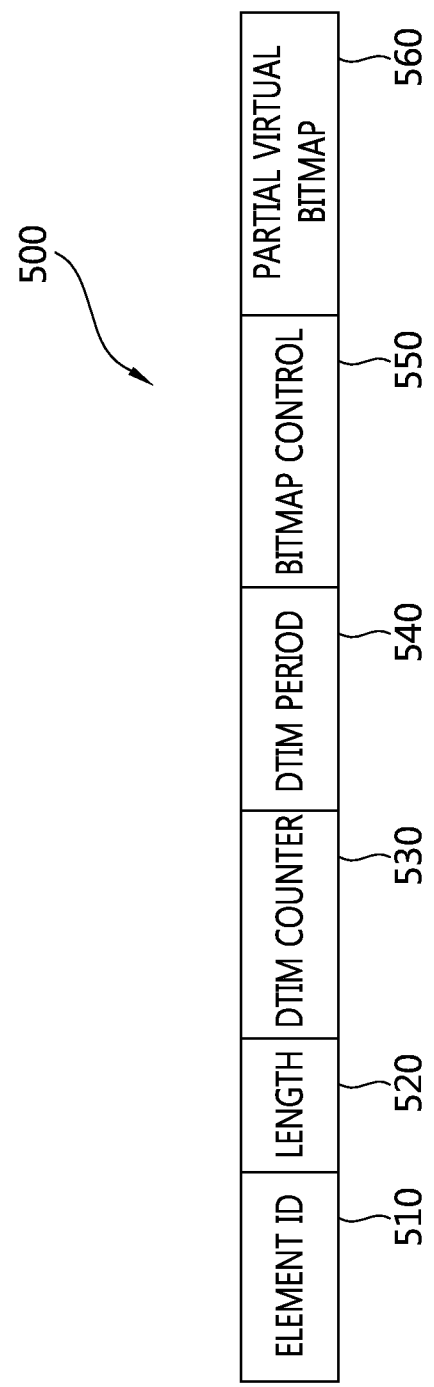
FIG. 5 is a block diagram illustrating an example of a TIM element format.

FIG. 5 is a block diagram illustrating an example of a TIM element format.

Referring to FIG. 5, a TIM element 500 includes an element ID field 510, a length field 520, a DTIM count field 530, a DTIM period field 540, a bitmap control field 550, and a partial virtual bitmap field 560.

The element ID field 510 is a field indicating that the corresponding information element is the TIM element. The length field 520 indicates the entire length including the length field and subsequent fields. A maximum value may be 255, and a unit may be set to an octet value.

The DTIM count field 530 notifies whether a current TIM element is the DTIM, and indicates the number of remaining TIMs until the DTIM is transmitted in the case where the current TIM element is not the DTIM. The DTIM period field 540 indicates a period at which the DTIM is transmitted, and the period at which the DTIM is transmitted may be set to a multiple of the number of times in which the beacon frame is transmitted.

The bitmap control field 550 and the partial virtual bitmap field 560 indicate whether a bufferable frame is buffered in the specific STA. The first bit of the bitmap control field 550 indicates whether a multicast/broadcast frame to be transmitted exists. The remaining bits are set so as to indicate an offset value for analyzing the next partial virtual bitmap field 560.

The partial virtual bitmap field 560 is set as a value indicating whether a bufferable frame to be sent to each STA exists. The partial virtual bitmap field 560 may be set by a bitmap format that sets the bit value corresponding to an AID value of the specific STA to 1. 1 to 2007 may be sequentially allocated in an AID order, and for example, when the fourth bit is set as 1, a traffic to be transmitted to the STA in which the AID is 4 is buffered in the AP.

Meanwhile, when a bit sequence of the partial virtual bitmap field 560 is set, it may be inefficient to use all bit sequences configuring a bit map in many situations where bits set as 0 are consecutive. To this end, offset information for the partial virtual bitmap field 560 may be included in the bitmap control field 550.

Figure 6:
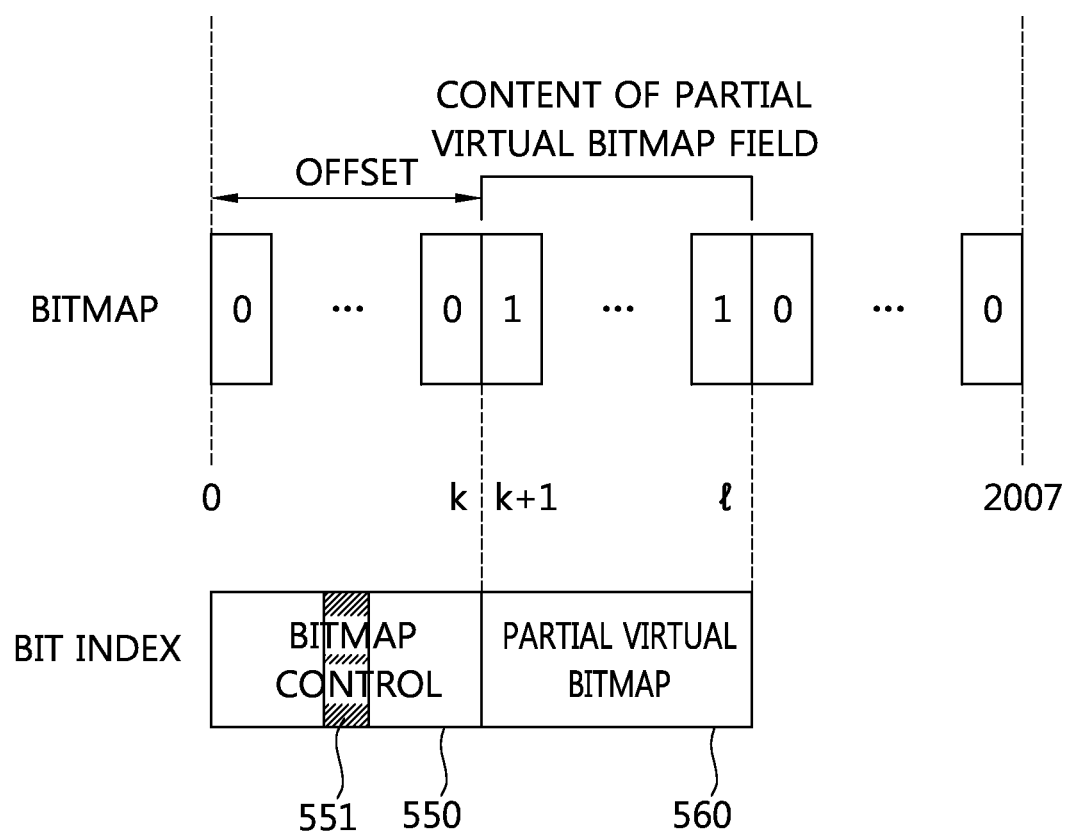
FIG. 6 is a diagram illustrating examples of a bitmap control field and a partial virtual bitmap field according to an exemplary embodiment of the present invention.

FIG. 6 is a diagram illustrating examples of a bitmap control field and a partial virtual bitmap field according to an exemplary embodiment of the present invention.

Referring to FIG. 6, a bitmap sequence configuring the partial virtual bitmap field 560 indicates whether a frame buffered in the STA having the AID corresponding to the corresponding bitmap index exists. The bitmap sequence configures indication information for the AID of 0 to 2007.

The bitmap sequence may be subsequently set to values of 0 from the first bit to the k-th bit. Further, the bitmap sequence may be subsequently set to values of 0 from the i-th bit to the last bit. This indicates that buffered frames do not exist in STAs receiving 0 to k to the AID and STA receiving 1 to 2007. As such, by providing offset information to a sequence of subsequent 0 of 0 to k-th bits at a front end of the bitmap sequence, when a sequence of subsequent 0 at a rear end thereof is omitted, a size of the TIM element may be reduced.

To this end, a bitmap offset sub field 551 including offset information of the subsequent 0 sequence of the bitmap sequence may be included in the bitmap control field 550. The bitmap offset sub field 551 may be set to indicate k, and the partial virtual bitmap field 560 may be set to include a k+1-th bit to an I−1-th bit of the original bitmap sequence.

A detailed response procedure of the STA receiving the TIM element will be described below with reference to FIGS. 7 to 9.

Figure 7:
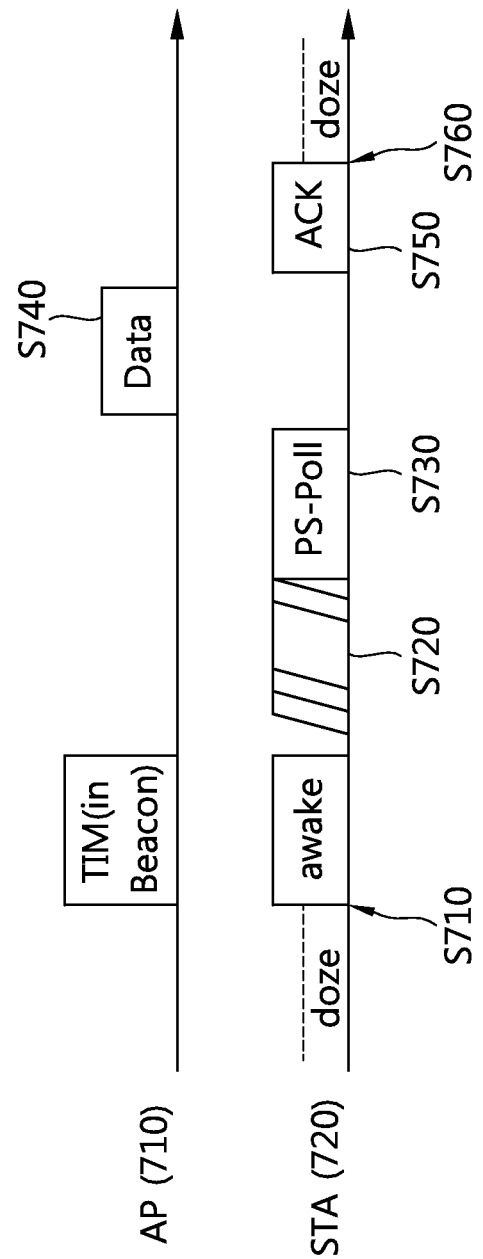
FIG. 7 is a flowchart illustrating an example of a response procedure of an AP in a TIM protocol.

FIG. 7 is a flowchart illustrating an example of a response procedure of an AP in a TIM protocol.

Referring to FIG. 7, a STA 720 shifts an operation state from a doze state to an awake state in order to receive a beacon frame including a TIM from an AP 710 (S710). The STA 720 analyzes the received TIM element to find that there is a buffered frame to be transmitted to the STA 720 itself.

The STA 720 contends with other STAs for medium access for the PS-poll frame transmission (S720), and transmits a PS-poll frame in order to request data frame transmission to the AP 710 (S730).

The AP 710 receiving the PS-poll frame transmitted by the STA 720 transmits a frame to the STA 720 (S740). The STA 720 receives a data frame and transmits an acknowledgement (ACK) frame to the AP 710 in receiving response thereto (S750). Thereafter, the STA 720 shifts the operation mode into the doze state again (S760).

As illustrated in FIG. 7, the AP may transmit data at a predetermined time after receiving the PS-poll frame, unlike an immediate response in which the data frame is transmitted as soon as the PS-poll frame is received from the STA.

Figure 8:
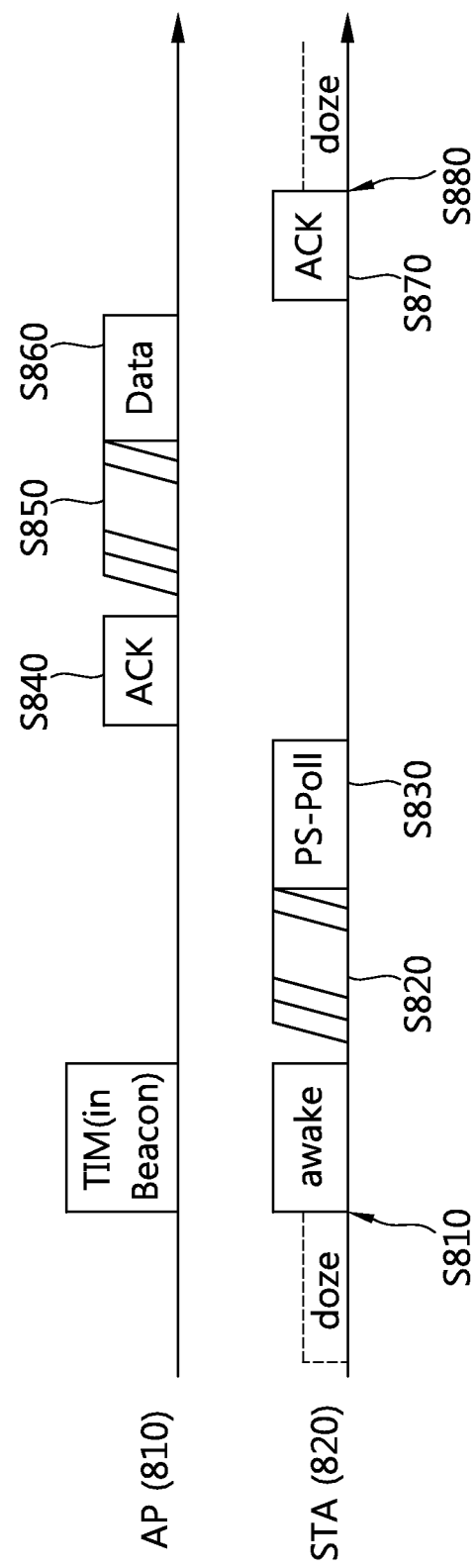
FIG. 8 is a flowchart illustrating another example of the response procedure of the AP in the TIM protocol.

FIG. 8 is a flowchart illustrating another example of the response procedure of the AP in the TIM protocol.

Referring to FIG. 8, an STA 820 shifts an operation state from a doze state to an awake state in order to receive a beacon frame including a TIM from an AP 810 (S810). The STA 820 analyzes the received TIM element to find that there is a buffered frame to be transmitted to the STA 820 itself.

The STA 820 contends with other STAs for medium access for the PS-poll frame transmission (S820), and transmits a PS-poll frame in order to request data frame transmission to the AP 810 (S830).

In the case where the AP 810 receives the PS-poll frame, but does not prepare the data frame for a predetermined time interval like a short interframe space (SIFS), the AP 810 transmits an ACK frame to the STA 820 without immediately transmitting the data frame (S840). This is a characteristic of a deferred response which is different from step S740 in which the AP 710 of FIG. 7 immediately transmits the data frame corresponding to the PS-poll frame to the STA 720.

The AP 810 transmits the data frame to the STA 820 (S860), after performing the contention when the data frame after the ACK frame transmission is prepared (S850).

The STA 820 transmits the ACK frame to the AP 810 in receiving response to the data frame (S870), and shifts the operation mode into the doze state (S880).

When the AP transmits the DTIM to the STA, a subsequent procedure of the TIM protocol may vary.

Figure 9:
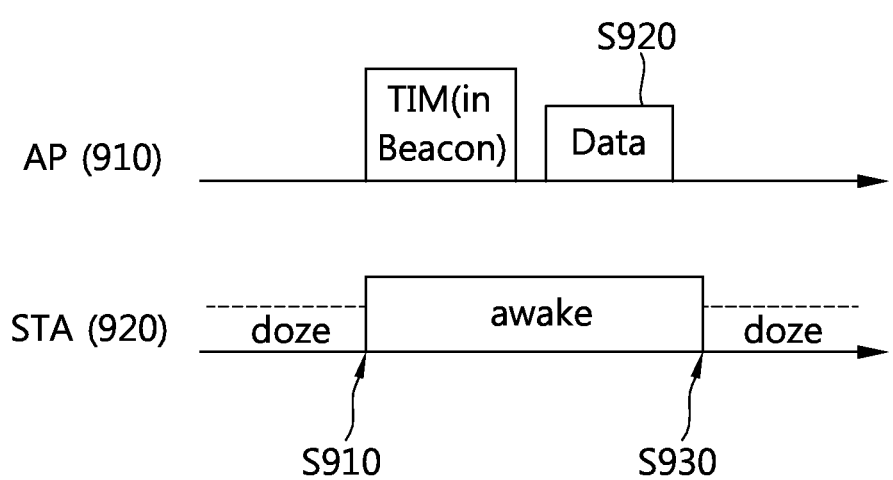
FIG. 9 is a flowchart illustrating a procedure of a TIM protocol by DTIM.

FIG. 9 is a flowchart illustrating a procedure of a TIM protocol by the DTIM.

Referring to FIG. 9, STAs 920 shift an operation state from a doze state to an awake state in order to receive a beacon frame including a TIM from an AP 910 (S910). The STAs 920 may find that a multicast/broadcast frame is transmitted through the received DTIM.

The AP 910 transmits the multicast/broadcast frame after transmitting the beacon frame including the DTIM (S920). The STAs 920 receives the multicast/broadcast frame transmitted by the AP 910 and then shifts the operation state into the doze again (S930).

In a power save mode operation method based on the TIM protocol referring to FIGS. 4 to 9, the STAs may verify whether the buffered frame to be transmitted due to a traffic buffered through STA identification information included in the TIM element exists. The STA identification information may be information regarding an association identifier (AID) which is an identifier allocated during coupling with the AP. The STA identification information may be set to directly indicate the AIDs of the STAs having the buffered frame, or set by a bitmap type in which a bit order corresponding to the AID value is set as a predetermined value. The STAs may verify that the buffered frames exist in the STAs when the STA identification information indicates the AID thereof.

For the power save of the STA, the power management operation based on an automatic power save delivery (APSD) may also be provided.

The AP which may support the APSD signals that the AP may support the APSD through a usage of an APSD subframe included in a capability information field of a beacon frame, a probe response frame, and an associated response frame. The STA which may support the APSD uses a power management field included in the frame control field of the frame in order to indicate whether the STA operates in the active mode or the power save mode.

The APSD is a mechanism for transferring downlink data and a bufferable management frame to the STA during the power save operation. The frame transmitted by the STA which is the power save mode in which the APSD is used sets a power management bit of the frame control field as 1, and as a result, buffering at the AP side may be caused.

The APSD defines two delivery mechanisms of an Unscheduled-APSD (U-APSD) and a scheduled-APSD (S-APSD). The STA may use the U-APSD so that some or all of the bufferable units thereof are delivered for a non-scheduled service period (SP). The STA may use the S-APSD so that some or all of the BUs thereof are delivered for a scheduled SP.

The STA using the U-APSD may not receive the frame transmitted by the AP for the SP due to interference. The AP may not sense the interference, but the AP may determine that the STA does not accurately receive the frame. A U-APSD coexistence capability value indicates a transmission duration requested by the STA to the AP to use the transmission duration as the SP for the U-APSD. The AP may transmit the frame for the SP, thereby improving possibility of receiving the frame in the situation where the STA receives the interference. Further, the U-APSD may reduce possibility that the frame transmitted by the AP for the SP is not successfully received.

The STA transmits an add traffic stream (ADDTS) request frame including the U-APSD coexistence element to the AP. The U-APSD coexistence element may include information on the requested SP.

The AP processes the requested SP and may transmit an ADDTS response frame in response to the ADDTS request frame. A state code may be included in the ADDTS request frame. The state code may indicate response information for the requested SP. The state code may indicate whether or to permit the requested SP, and further indicate a reject reason when the requested SP is rejected.

When the requested SP is permitted by the AP, the AP may transmit the frame to the STA for the SP. The duration of the SP may be specified by the U-APSD coexistence element included in the ADDTS request frame. A start of the SP may be a time when the STA transmits a trigger frame to the AP and the AP normally receives the trigger frame.

The STA may enter into the doze state when the U-APSD service period is completed.

Meanwhile, in recent years, with appearance of various communication services including smart grid, e-health, and ubiquitous, a machine to machine (M2M) technology for supporting the communication services has come into the spotlight. Sensors that sense temperature, humidity, and the like, cameras, home appliances including a TV and the like, process machines in a factory, large-sized machines such as an automobile may be one of components that constitute an M2M system. The components that constitute the M2M system may transmit and receive data based on WLAN communication. When devices constituting the M2M system support the WLAN and constitute the network, this is hereinafter called an M2M WLAN system.

In the WLAN system supporting the M2M, a frequency band of 1 GHz or more may be used, and a usage of a low band frequency may have a characteristic in which the service coverage is further widened. Accordingly, the number of wireless apparatuses positioned in the service coverage may be larger than that of the existing WLAN system. In addition, features of the WLAN system that supports M2M will be described below.

1) Number of many STAs: In the M2M, it is assumed that many STAs exist in the BSS unlike the existing network. The reason is that all sensors installed in a home, a company, and the like are considered as well as devices possessed by individuals. Therefore, a large number of STAs may access one AP.

2) Low traffic load per each STA: Since an M2M terminal has a traffic pattern of collecting and reporting surrounding information, the M2M terminal need not frequently send the information and the amount of the information is also small.

3) Uplink centered communication: The M2M primarily has a structure of taking an action by receiving a command through a downlink and thereafter, reports result data through an uplink. Since main data is generally transmitted through the uplink, the uplink is central in the system that supports the M2M.

4) Power management of STA: The M2M terminal primary operates by a battery and there are many cases that it is difficult for a user to frequently charge the M2M terminal. Accordingly, a power management method for minimizing batter consumption is required.

5) Automatic recovery function: Since it is difficult for a person to operate the devices constituting the M2M system under a specific situation, the devices need a function in which the devices recover themselves.

According to a server/client structure in a general WLAN system, it is general that a client such as the STA requests information to a server and the server transmits the information (data) to the STA in response to the request. In this case, the server is referred to as a machine of mechanically collecting and providing the information, and a subject receiving the information may be referred to as a user using the client. Due to such a structural characteristic, in the existing WLAN system, a downlink-directional communication technology has been mainly developed.

On the other hand, in the WLAN system supporting the M2M, the above structure is reversed. That is, the client as the machine serves to collect and provide the information, and the user managing the server may have a role of requesting the information. That is, in the WLAN system supporting the M2M, a communication flow is general, in which the M2M server issues a command related with a neighboring environment measurement to the M2M STA, and the M2M STAs perform operations according to the command and report the collected information to the sever. Unlike this, the structural feature of the WLAN system that supports the M2M is that the user accesses the network at the server side and the communication flow is changed in an opposite direction.

In such a WLAN environment, when the STA prevents the awake state from being unnecessarily maintained and verifies that the buffered frame exists, a power save mechanism to shift into the awake state in order to receive the buffered frame may be provided.

The transmitting and receiving of the frame based on the power save mechanism by the STA may be performed based on the TIM protocol as illustrated in FIGS. 4 to 9. According to the TIM protocol, when the AP transmits the data frame after receiving the PS-poll frame from the STA, the AP may transmit one buffered frame, that is, the PSDU in response to the PS-poll frame. Meanwhile, in an environment of a lot of buffered traffic for the corresponding STA, it is not efficient in terms of traffic handling that the AP transmits only one buffered frame in response to the PS-poll frame.

As a method for compensating for such a problem, the U-APSD may be applied to the method of transmitting and receiving the frame based on the TIM protocol. The STA may receive at least one frame from the AP for a service period for the STA itself.

Figure 10:
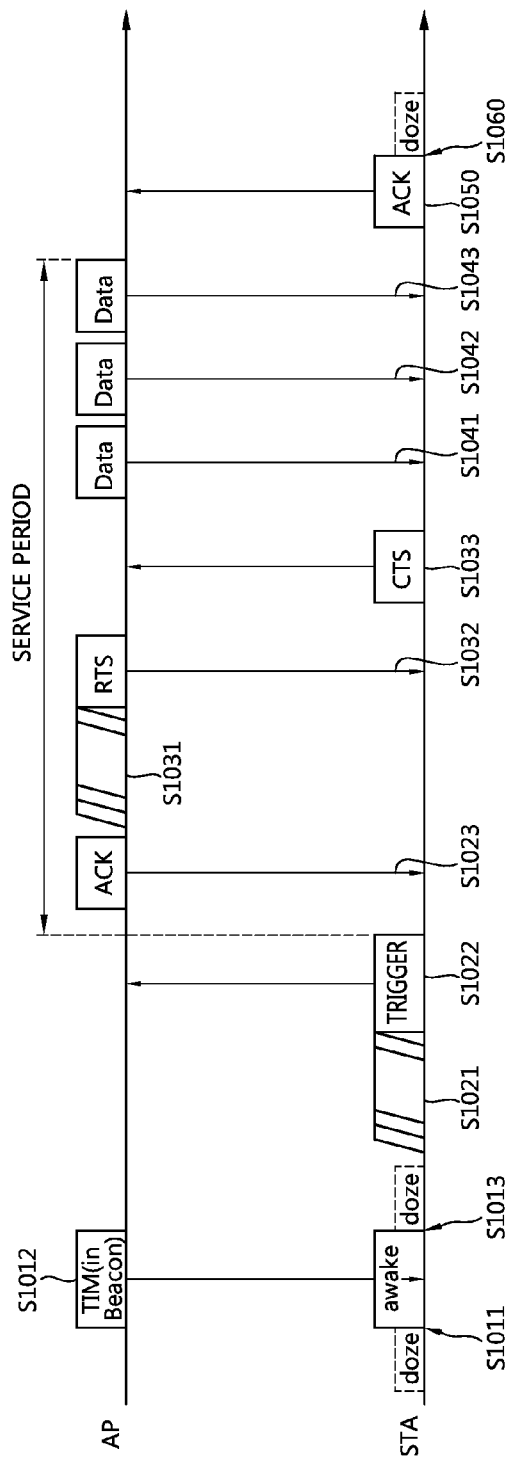
FIG. 10 is a diagram illustrating an example of a method of transmitting and receiving frames based on the TIM protocol and U-APSD.

FIG. 10 is a diagram illustrating an example of a method of transmitting and receiving frames based on the TIM protocol and the U-APSD.

Referring to FIG. 10, the STA in the doze state enters into the awake state in order to receive the TIM element (S1011).

The STA receives the TIM element (S1012). The TIM element may be included in the beacon frame to be transmitted. When the UE receives the TIM element, the UE may determine whether a bufferable frame for the UE itself is buffered based on the bitmap sequence of the partial virtual bitmap field included in the TIM element and the AID of the STA.

The STA verifying that the buffered frame exists enters into the doze state again (S1013).

The STA enters into the awake state again at the time when the buffered frame will be transmitted and acquires a channel access authority through the contention (S1021). The STA acquires the channel access authority and transmits the trigger frame to notify that the service period for the STA starts (S1022).

The AP transmits the ACK frame to the STA in response to the trigger frame (S1023).

The AP may perform an RTS/CTS exchanging procedure in order to transmit the buffered frame into the service period. The AP acquires the channel access authority through the contention in order to transmit the RTS frame (S1031). The AP transmits the RTS frame to the STA (S1032), and the STA transmits the CTS frame to the AP in response thereto (S1033).

The AP transmits the data frame related with at least buffered frame at least one time after the RTS/CTS exchanging (S1041, S1042, and S1043). When the AP sets (EOSP) of the QoS service field of the frame as '1' when finally transmitting the frame, the STA may receive the last frame and recognize that the service period ends.

The STA transmits the ACK frame to the AP in response to at least one frame received when the service period ends (S1050). In this case, the ACK frame may be a block ACK as acknowledgement for the plurality of frames. The STA transmitting the ACK frame enters into the doze state (S1060).

According to the method of transmitting and receiving the frame described above with reference to FIG. 10, the STA may start the service period at a desired time and receive at least one frame for one service period. Accordingly, efficiency in terms of traffic handling may be improved.

In the method of transmitting and receiving the frame for the STA operating in the power save mode, when the STAs which intend to receive the buffered frame from the AP have a hidden node relationship, a collision during the channel access for the buffered frame request may occur.

Figure 11:
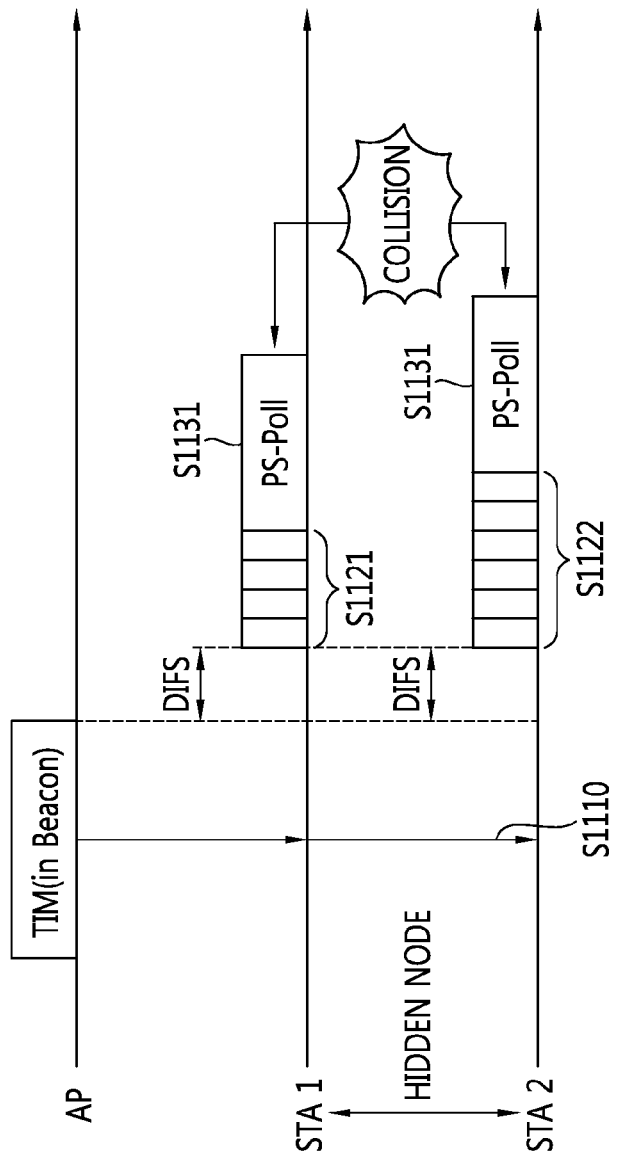
FIG. 11 is a diagram illustrating an example of collision which may be generated when the frames are transmitted and received.

FIG. 11 is a diagram illustrating an example of collision which may be generated when the frames are transmitted and received.

Referring to FIG. 11, it is assumed that the STA1 and the STA2 are associated with the AP, and each of the STA1 and the STA2 may transmit and receive the frame to and from the AP, but transmission and reception of the wireless signal has an impossible hidden node relationship in addition to the frame transmission and reception therebetween.

The STA1 and the STA2 which are operating in the power save mode receive the TIM element from the AP (S1110). The TIM element may be included in the beacon frame to be broadcasted from the AP. When the STA1 and the STA2 receive the TIM element, the STA1 and the STA2 may determine whether buffered frames for the STA1 and the STA2 are existed based on the bitmap sequence of the partial virtual bitmap field included in the TIM element and the AID allocated from the AP by each STA. In the example, it is assumed that the buffered frames for the STA1 and the STA2 exist.

The STA1 attempts the channel access in order to request the transmission of the buffered frame (S1121). The STA2 also attempts the channel access in order to request the transmission of the buffered frame (S1122). The STA1 and the STA2 may perform the channel access attempt after waiting for a predetermined time (e.g. DIFS) after receiving the TIM element.

The STA1 and the STA2 perform contention for the channel access. Each of the STA1 and the STA2 may set a back-off timer, and the back-off timer may be randomly set. In the example, it is assumed that the STA1 sets the back-off timer to '4' and the STA2 sets the back-off timer to '6'.

The STA1 and the STA2 sense the channel for a slot time to decrease the back-off timer one by one when the idle state is maintained and transmit the PS-poll frame when the back-off timer is 0. Here, the slot time is a channel idle time unit required to decrease the back-off timer in the contention process. Accordingly, the STA1 first accesses the channel to transmit the PS-poll frame (S1131).

Even though the STA1 transmits the PS-poll frame, the STA2 which is the hidden node of the STA1 may not receive (or overhear) the PS-poll frame transmitted by the STA1, and thereafter, may determine that the channel is in the idle state through the channel sensing for the slot time. Accordingly, the STA2 may transmit the PS-poll frame to the AP when the value of the back-off timer is decreased to be '0' (S1132).

As such, even though the STA1 and the STA2 performs the channel access through the contention for preventing the collision, a phenomenon in which each transmitted PS-poll frame causes the collision.

In order to prevent such a collision, a larger value than the time for transmitting the PS-poll frame may be applied to the slot time related with the back-off timer during the contention for the channel access. Such an example will be described with reference to FIG. 12.

Figure 12:
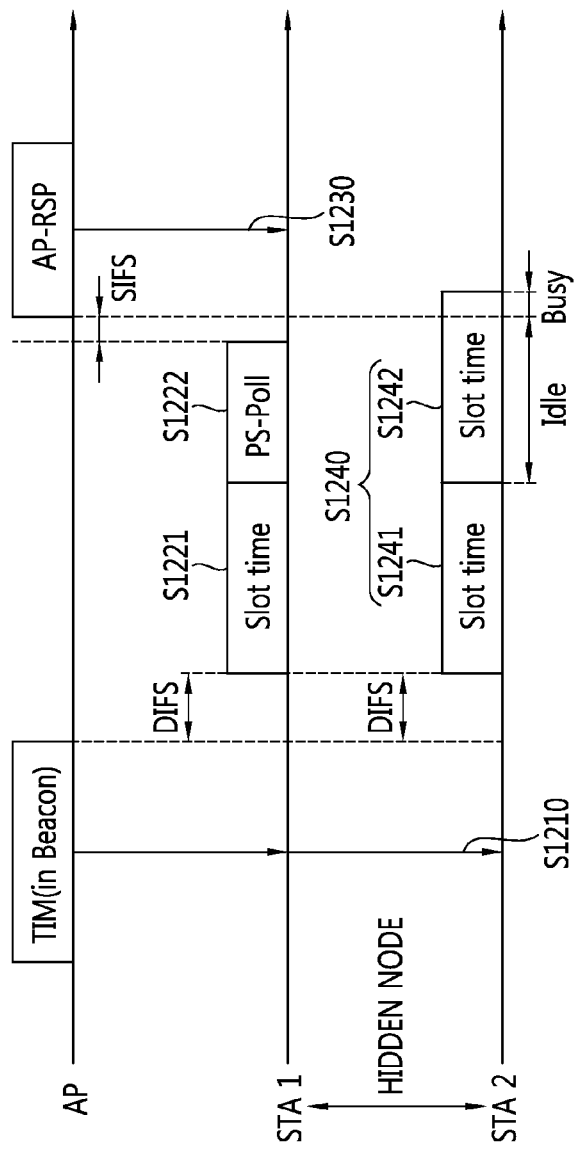
FIG. 12 is a diagram illustrating an example of a channel access method for transmitting and receiving frames according to the exemplary embodiment of the present invention.

FIG. 12 is a diagram illustrating an example of a channel access method for transmitting and receiving frames according to the exemplary embodiment of the present invention.

Referring to FIG. 12, the STA1 and the STA2 are associated with the AP, and each of the STA1 and the STA2 may transmit and receive the frame with the AP, but it is assumed that transmission and reception of the wireless signal has an impossible hidden node relationship in addition to the frame transmission and reception therebetween.

The STA1 and the STA2 which are operating in the power save mode receive the TIM element from the AP (S1210). The TIM element may be included in the beacon frame to be broadcasted from the AP. When the STA1 and the STA2 receive the TIM element, the STA1 and the STA2 may determine whether bufferable frames for the STA1 and the STA2 are buffered based on the bitmap sequence of the partial virtual bitmap field included in the TIM element and the AID allocated from the AP by each STA. In the example, it is assumed that the buffered frames for the STA1 and the STA2 exist.

The STA1 attempts the channel access in order to request the transmission of the buffered frame (S1221). The STA1 may perform the channel access attempt after waiting for a predetermined time (e.g. DIFS) after receiving the TIM element. The STA1 performs the contention for the channel access. The STA1 may set a back-off timer, and the back-off timer may be randomly set. In the example, it is assumed that the STA1 sets the back-off timer to '1'. The STA1 senses the channel for a slot time to verify that the channel is in the idle state, and decreases the back-off timer to '0'. As a result, the STA1 transmits the PS-poll frame to the AP in order to request the transmission of the buffered frame (S1222).

The AP receives the PS-poll frame transmitted from the STA1 and responds thereto (S1230). The AP may transmit the buffered frame corresponding to the PS-poll frame to the STA1 or transmit the ACK frame to the STA1.

Meanwhile, the STA2 also waits for a predetermined time (e.g. DIFS) after receiving the TIM element and attempts the channel access (S1240). The STA2 performs the contention for the channel access. In the example, it is assumed that the STA2 sets the back-off timer to '2'. The STA2 senses the channel for a slot time to verify that the channel is in the idle state, and decreases the back-off timer to '1' (S1241).

Thereafter, the STA2 senses the channel for the slot time (S1242). The STA1 accesses the channel to transmit the PS-poll frame, but since the STA1 does not receive the PS-poll frame, the STA1 determines that the channel is in the idle state. However, when the response by the AP starts, the STA1 determines that the channel is busy from the corresponding period. Accordingly, with respect to the slot time when the channel is busy in the STA1, the STA2 does not decrease the back-off timer. Therefore, it is possible to prevent the collision between the STA1 and the STA2.

In the aforementioned example of FIG. 12, the slot time is set to be longer than the transmission time of the PS-poll frame to prevent the collision between two STAs having a hidden node relationship. In the example, a length of an extended slot time may be set as illustrated in the following Equation 1.

$$T_{Slot\_Time} = T_{PS\_poll} + SIFS + T_{CCA\_Response\_Frame} + 2 \times T_{Air\_Propagation\_Delay} \qquad [\text{Equation 1}]$$

Here, $T_{Slot\_Time}$ represents a length of the slot time, $T_{PS\_poll}$ represents a transmission time of the PS-poll frame, $T_{CCA\_of\_Response\_Frame}$ represents a CCA sensing time for a response frame of the AP, and $T_{Air\_Propagation\_delay}$ represents a delivery propagation time.

Through the length extension of the slot time, the problem of the collision between the STAs of the hidden node relationship may be solved. However, the slot time of the extended length has a problem that a consumed time may be increased by the contention process performed by the STA. Accordingly, a method of increasing the slot time and decreasing the time consumed in the contention process may be additionally required.

The time consumed in the contention process may depend on the length of the slot time and the back-off set value. The STAs performing the contention may set the same back-off timer value. Each STA senses that the channel is in the idle state for each slot time to decrease the back-off timer value, and in this case, the back-off timers of the STAs may be simultaneously decreased to '0'. Accordingly, the STAs simultaneously attempt the access to the channel to cause the collision between the STAs. When the collision is caused, the STAs set the back-off timers again to perform the contention, and as a result, the contention time is increased. That is, the contention time of the STAs may be increased by setting the same back-off value of the STAs.

Accordingly, the slot time of the extended time is applied, and simultaneously, in order to prevent the collision duet to the channel access, an initial value of the back-off timer which is determined by the STA may be uniquely set with respect to each STA. The initial value of the back-off timer which is set by each STA may be determined according to a position of a bit related with a specific STA, in the bitmap type information (virtual bitmap field) of the TIM element. Meanwhile, since the position of the bit related with the specific STA, in the bitmap type information is determined by the AID of the STA, the value of the back-off timer may be determined by the AID of the STA. As such, a method of performing the contention based on an initial back-off timer set as a unique value will be described with reference to FIG. 13.

Figure 13:
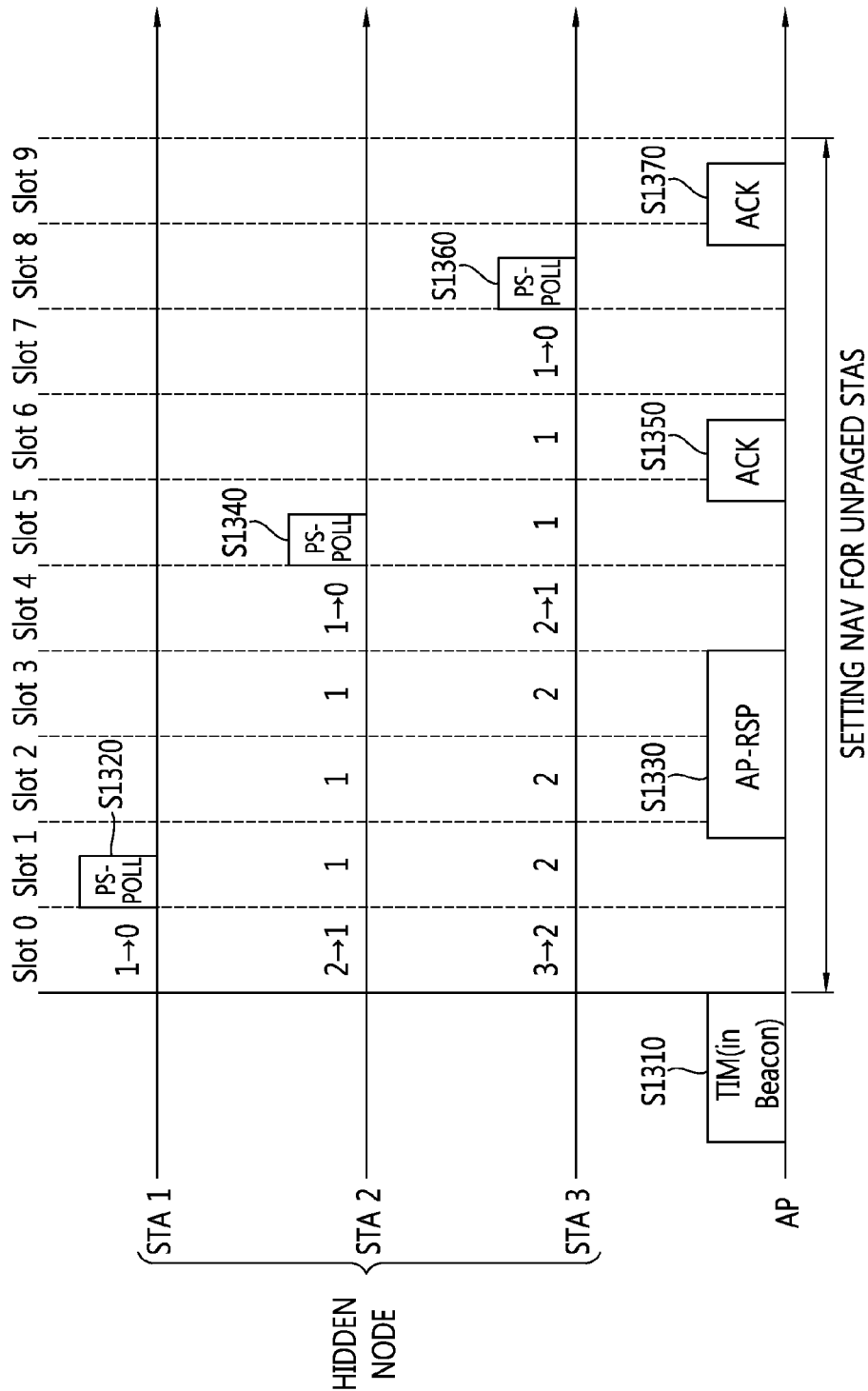
FIG. 13 is a diagram illustrating an example of a method for transmitting and receiving frames based on a unique back-off timer according to the exemplary embodiment of the present invention.

FIG. 13 is a diagram illustrating an example of a method for transmitting and receiving frames based on a unique back-off timer according to the exemplary embodiment of the present invention.

Referring to FIG. 13, the AP is associated with the STA1, the STA2, and the STA3, and has a buffered frame for each STA. Further, it is assumed that each STA has a hidden node relationship, and may be transmitted and received with the AP.

Each STA sets a unique back-off timer value. In the example, the STA1 is set as '1', the STA2 is set as '2', and the STA3 is set as '3' of the back-off timer. The set values of the back-off timer may be determined by the position of the bit related with the corresponding STA included in the virtual bitmap field of the TIM element received by each STA.

The STA1, the STA2, and the STA3 may receive the TIM element received from the AP, and recognize that the buffered frame for each STA exists (S1310). The AP may set NAVs for unpaged STAs which are not related with the transmission and reception of the buffered frame for a period for the transmission and reception of the buffered frame when transmitting the TIM element. As a result, it is possible to prevent the transmission and reception of the buffered frame from being influenced through the channel access and/or the channel assess attempt by the unpaged STAs.

The STA1 in which the initial value of the back-off timer is set as '1' verifies that the channel is in the idle state through the carrier sensing for a slot time of 0, and decreases the back-off timer value to '0'. Accordingly, the STA1 transmits the PS-poll frame requesting the transmission of the buffered frame in a slot time 1 to the AP (S1320). The AP transmits the buffered frame for the STA1 to the STA1 in response to the PS-poll frame transmitted from the STA1 (S1330). In the example, it is assumed that the AP transmits the buffered frame to the STA1 up to a slot time 3.

The STA2 and the STA3 in which the initial back-off timer values are set as '2' and '3' verify that the channel is in the idle state for the slot time 0, and decreases the back-off timer values to '1' and '2'. The STA2 and the STA3 may not receive (or overhear) the PS-poll frame transmitted by the STA1 for the slot time 1 period to recognize that the channel is in the idle state for the corresponding time, but sense the wireless signal related with the buffered frame transmitted from the AP to the STA1 to recognize that the channel is busy. Accordingly, the STA2 and the STA3 do not decrease the back off timer up to the slot time 3.

After the buffered frame from the AP to the STA1 is completed, the STA2 verifies that the channel is in the idle state through the carrier sensing for a slot time 4 period and decreases the back-off timer value to '0'. Accordingly, the STA2 transmits the PS-poll frame requesting the transmission of the buffered frame to a slot time 5, to the AP (S1340). The AP may transmit the ACK frame to the STA2 in response to the PS-poll frame transmitted from the STA2 (S1350). This means that the response of the AP for the STA1 is an immediate response, but the response of the AP for the STA2 is a deferred response.

For the slot time 4, the STA3 verifies that the channel is in the idle state through the carrier sensing and decreases the back-off timer value to '1'. The STA3 may not receive (or overhear) the PS-poll frame transmitted by the STA2 for a slot time 5 period to recognize that the channel is in the idle state for the corresponding time, but sense the wireless signal related with the ACK frame transmitted from the AP to the STA2 to recognize that the channel is busy. Accordingly, the STA3 does not decrease the back-off timer value for periods of the slot times 5 and 6.

For a slot time 7 period, the STA3 verifies that the channel is in the idle state through the carrier sensing and decreases the back-off timer value to '0'. Accordingly, the STA3 transmits the PS-poll frame requesting the transmission of the buffered frame to a slot time 8, to the AP (S1360). The AP may transmit the ACK frame to the STA3 in response to the PS-poll frame transmitted from the STA3 (S1370). This means that the response of the AP for the STA3 is the deferred response.

In the situation such as an example illustrated in FIG. 13, it is assumed that the STA2 does not receive the TIM element and does not transmit the PS-poll frame, or that the STA2 receives the TIM element, but the buffered frame for the STA2 does not exist, and the STA2 does not set the NAV. In this case, the STA3 may verify that the channel is in the idle state for the slot time 5 period, decrease the back-off timer to '0', and transmit the PS-poll frame to the AP at the slot time 6.

According to the exemplary embodiment of the present invention described above with reference to FIG. 13, if it is not an overlapped BSS (OBSS) environment, scheduling of the PS-poll frame transmission of paged STAs may be supported. Further, in the case where an error is generated in TIM decoding or even in another exceptional environment, the buffered frame is transmitted through the transmission of the scheduled PS-poll frame, and the collision between the STAs may be avoided.

In the example of FIG. 13, when there is no NAV setting for the unpaged STAs, the unpaged STAs may access the channel to transmit the data. In this case, the unpaged STAs may access the channel between the channel access periods of the paged STAs, and as a result, the PS-poll frame transmission of the paged STAs may be deferred. That is, the PS-poll frame transmission of the paged STAs may be scheduled, and the channel access and the data transmission of the unpaged STAs may be performed based on the contention.

A setting method of the initial back-off timer value based on the partial virtual bitmap of the TIM element may be determined based on an ordered AID order index. Detailed methods may be divided into two of a method of considering both the paged STAs and the unpaged STAs and a method of considering only the paged STAs.

1) Method of Considering Both Paged STAs and Unpaged STAs

Regardless if the bit value indicated in the partial virtual bitmap is '1 (paged)' or '0 (unpaged)', the initial back-off timer values may be sequentially set.

For example, in the case where a bit map for STA0 to STA9 is set as '1 0 0 1 1 1 0 1 0 0', the initial back off timers of the STA0 to the STA9 may be set as 0, 1, 2, 3, 4, 5, 6, 7, 8, and 9, respectively. In such a method, when the initial back-off timers are set by considering the unpaged STAs and the NAV is set to the unpaged STAs, transmission loss may occur for the corresponding period due to a dummy initial value which is not used in the unpaged STAs. That is, the unpaged STAs do not access the channel for an NAV period, but a large initial back off value may be allocated to a specific paged STA due to the initial back-off timer values allocated to the corresponding STAs. As a result, even in the case where the channel is continuously in the idle state, the corresponding STA does not access the channel until the back-off timer is decreased to '0', and thus the loss of the wireless resource may occur. Accordingly, in the case where the example is applied, it may be more efficient that the NAV for the unpaged STAs is not set.

2) Method of Considering Only Paged STAs

An initial back-off timer value for only the STAs in which the value indicated in the partial virtual bitmap corresponds to '1 (paged)' may be mapped.

For example, in the case where a bit map for STA0 to STA9 is set as '1 0 0 1 1 1 0 1 0 0', the initial back off timers for the STAs 0, 3, 4, 5, and 7 may be set as 0, 1, 2, 3, and 4, respectively. In the case where the initial back-off timer is set by considering only the paged STAs, it may be advantageous in terms of the channel access of the paged STAs and the buffered frame processing efficiency that the NAV is set to the unpaged STAs.

When the initial back-off timer value is determined based on an order in which bits indicating whether the buffered frame for the corresponding STA exists are included in the partial virtual bitmap field, fixed timer values are always set until the AID value of the STA is changed. Accordingly, the STA receiving an AID having a small value sets an initial back-off timer having a small value, and as a result, possibility of accessing the channel earlier than other STAs is relatively high. On the other hand, the STA receiving an AID having a large value sets an initial back-off timer having a large value, and as a result, possibility of accessing the channel later than other STAs is relatively high. This may cause a processing problem related with the channel access. In order to solve the problem, the initial back-off timer value may be flexibly applied, and this will be performed below.

First, a method in which the initial back-off timer value is changed according to a predetermined transmission time, for example, a target beacon transmission time (TBTT) or a multiple of the TBTT may be proposed. The method of changing the initial back-off timer value may include at least one process of randomization/permutation, cyclic shift, and reverse. Each process may be a time synchronization function (TSF) defined in the beacon frame or a predetermined value. TSF time information may be illustrated in the following Table 2.

TABLE 2

| Name | Type | Effective range | meaning |
|---|---|---|---|
| Result Code | Enumeration | SUCCESS/ FAILURE | Result report of MLME-GETTSFTIME.request primitive |
| TSF time | Integer | $0-(2^{64}-1)$ | TSF timer value, which is existing if result code is SUCCESS |

The proposed method may be applied to only the paged STAs, and may be applied to both the paged STAs and the unpaged STAs.

Randomization/Permutation

For example, in the case where the initial back-off timer is determined based on only the paged STAs, when the virtual bitmap field is '1 0 0 1 1 1 0 1 0 0', the initial back-off timers for the STAs 0, 3, 4, 5, and 7 may be set as 0, 1, 2, 3, and 4 in a beacon frame transmission time N (e.g. TSF time), respectively. The initial back-off timers may be permuted and set with 3, 1, 4, 0, and 2 in the next N+1 (e.g. next TSF time). A polynomial expression and/or matrix applied for the permutation may be implemented through a pseudo-random generator which sets the beacon frame transmission time as a seed value. An example of a permutation matrix P applied in the example may be referred to the following Equation 2.

$$\begin{bmatrix} 3 \\ 1 \\ 4 \\ 0 \\ 2 \end{bmatrix} = P \begin{bmatrix} 0 \\ 1 \\ 2 \\ 3 \\ 4 \end{bmatrix}, P = \begin{bmatrix} 0 & 0 & 0 & 1 & 0 \\ 0 & 1 & 0 & 0 & 0 \\ 0 & 0 & 0 & 0 & 1 \\ 1 & 0 & 0 & 0 & 0 \\ 0 & 0 & 1 & 0 & 0 \end{bmatrix}$$ [Equation 2]

Cyclic Shift

In the aforementioned example, in the case where the initial back-off timer values such as 0, 1, 2, 3, and 4 are set to the STA0 to the STA4 at the transmission time N (e.g. TSF time), at the transmission time N+1, the initial back-off timer values may be left-cyclic shifted to 1, 2, 3, 4, and 0 or right-cyclic shifted to 4, 0, 1, 2, and 3.

When the above specific example is further generalized, if a length of the bitmap sequence of the partial virtual bitmap field represents L and a rearranged result for M paged STAs is 0 to M−1, the initial back-off times of M paged STAs at the transmission time N (e.g. TSF time) may be expressed like the following Equations 3 and 4.

$$\mathrm{mod}([0+N, 1+N, \ldots, M-1+N], M)$$ [Equation 3]

$$\mathrm{mod}([0-N, 1-N, \ldots, M-1-N], M)$$ [Equation 4]

Reverse Operation

In the aforementioned example, in the case where the initial back-off timer values such as 0, 1, 2, 3, and 4 are set to the STA0 to the STA5 at the transmission time N (e.g. TSF time), the initial back-off timer values may be expressed as 4, 3, 2, 1, and 0.

When the above specific example is further generalized, if a length of the bitmap sequence of the partial virtual bitmap field represents L and a rearranged result for M paged STAs is 0 to M−1, the initial back-off times of M paged STAs at the transmission time N (e.g. TSF time) may be expressed as follows.

In the case where N is an even number: [0 1 2 3 4], in the case where N is an odd number: [4 3 2 1 0], or in the case where N is an even number: [4 3 2 1 0], in the case where N is an odd number: [0 1 2 3 4]

Meanwhile, the initial back-off timer value may be set based on a priority of the STAs. The priority of STAs may be varied according to a class or service type. The STA having high priority may be implemented to set a large initial back-off timer value, and the STA having low priority may be implemented to set a small initial back-off timer value.

Hereinabove, in order to maintain fairness of acquiring a channel access authority of the STAs in which the buffered frames exist through the TIM element, a mechanism of setting the initial back-off timers of the STAs will be described. The method of uniquely setting the initial back-off timer may be applied to an environment in which the slot time is set to be larger than the transmission time of the PS-poll frame like the aforementioned exemplary embodiment, and even an environment in which the time slot is set to be smaller than the transmission time of the PS-poll frame like the related art. In this case, a time when each STA starts the back-off through the contention is set uniquely for each STA, and the aforementioned method may be applied. The exemplary embodiment will be described with reference to FIG. 14.

Figure 14:
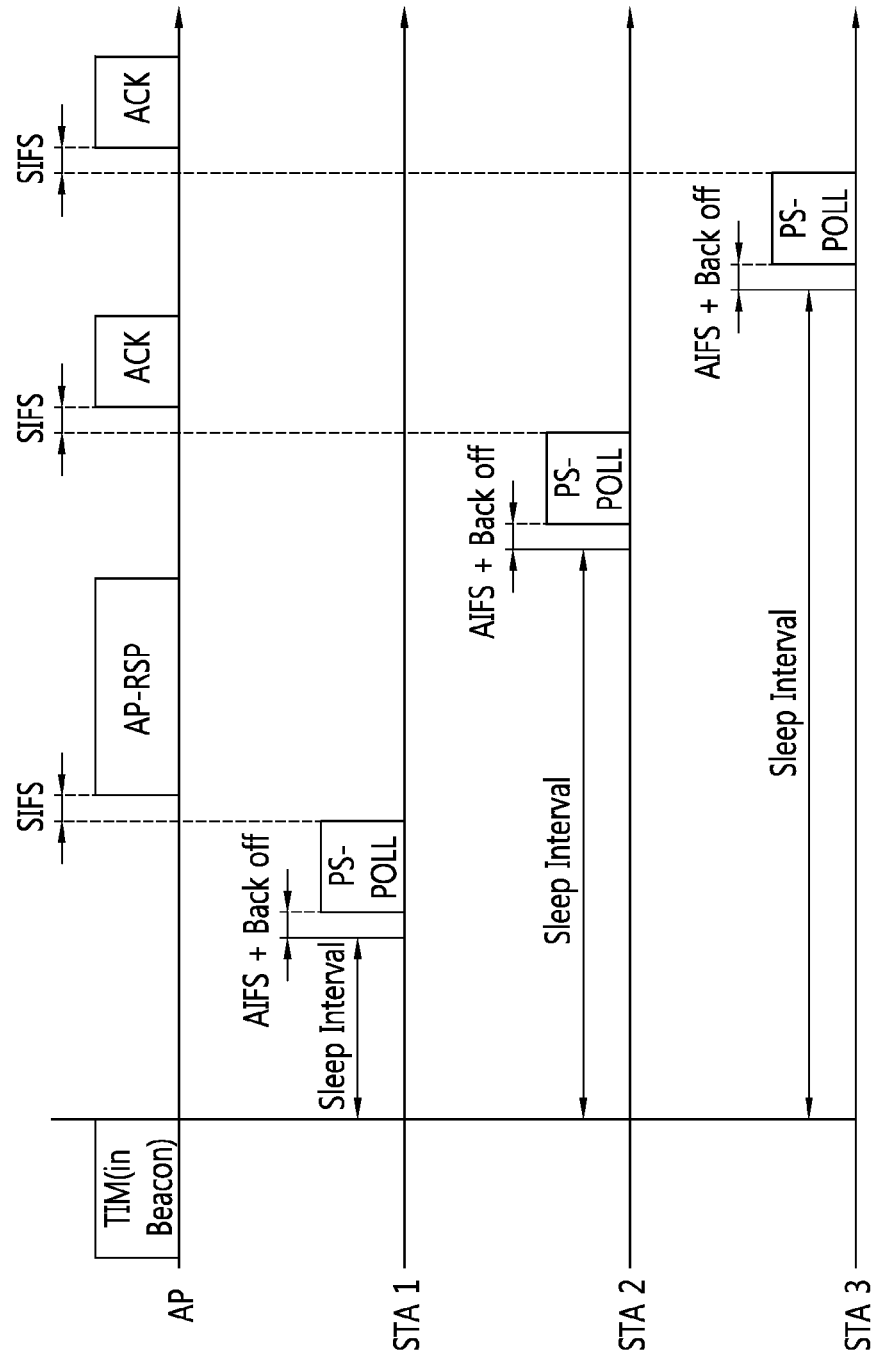
FIG. 14 is a diagram illustrating an example of a channel access method according to another exemplary embodiment of the present invention.

FIG. 14 is a diagram illustrating an example of a channel approaching method according to another exemplary embodiment of the present invention.

Referring to FIG. 14, in order to transmit the PS-poll frame requesting the transmission of the buffered frame to each paged STA, times of starting the contention are different from each other. The contention starting time of each STA may be set based on the method of uniquely setting the initial back-off timer value of each STA for each STA described above. As a result, each paged STA performs the contention at a starting time set as a unique value after receiving the TIM element to acquire the channel access authority and then transmit the PS-poll frame to the AP. Meanwhile, before the starting time set as the unique value for each paged STA arrives, the corresponding STA may operate in the doze state. Accordingly, the starting time until the TIM element is received and the contention is performed may be referred to as a sleep interval.

Figure 15:
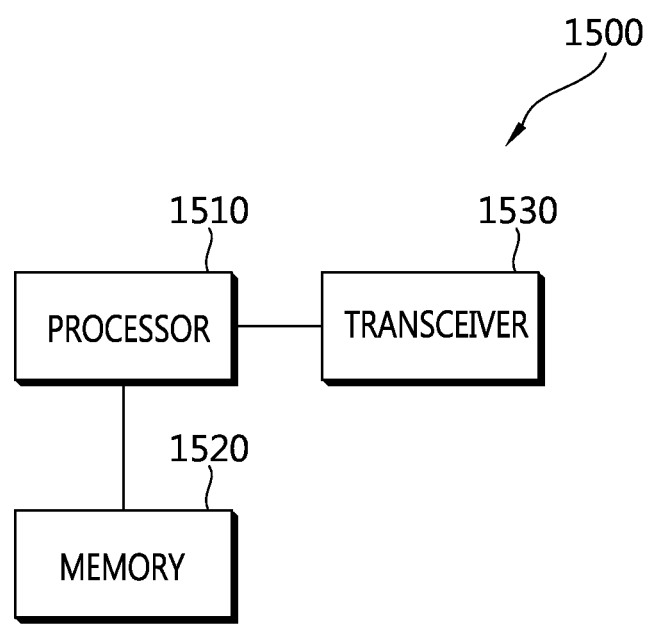
FIG. 15 is a block diagram illustrating a wireless apparatus in which an exemplary embodiment of the present invention can be implemented.

FIG. 15 is a block diagram illustrating a wireless apparatus in which an exemplary embodiment of the present invention can be implemented.

Referring to FIG. 15, the wireless apparatus 1500 includes a processor 1510, a memory 1520, and a transceiver 1530. The transceiver 1530 transmits and/or receives a radio signal, however, implements a physical layer of IEEE 802.11. The processor 1510 may be set to operate in functional connection with the transceiver 1530. The processor 1510 may be set to perform the power save mode operating method and the method of transmitting and receiving the frame according to the exemplary embodiment of the present invention. The processor 1510 may be set to transmit the data unit by inserting a pilot tone to the symbol, like the exemplary embodiment of the present invention described with reference to FIGS. 11 to 19. The processor 1510 may be set to implement the exemplary embodiments according to the accompanying drawings.

The processor 1510 and/or transceiver 1530 may include an application-specific integrated circuit (ASIC), other chipset, a logic circuit, and/or a data processing device. When the exemplary embodiment is implemented by software, the aforementioned technique may be implemented by a module (a process, a function, and the like) performing the aforementioned function. The module may be stored in the memory 1520 and may be executed by the processor 1510. The memory 1520 may be included in the processor 1210 and functionally connected with the processors 1510 by various means which is separately positioned and known.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method of transmitting and receiving a frame performed by a first station (STA) that operates in a power save mode in a wireless local area network (WLAN) system, comprising:
   receiving a traffic indication map (TIM) element including a bitmap sequence, wherein the bitmap sequence includes a first bit indicating that a buffered frame for the first STA exists and a second bit indicating that a buffered frame for a second STA exists;
   setting a back-off timer for the first STA based on a bit index of the first bit and the second bit, wherein the back-off timer for the first STA is a value of at least one slot time, wherein if the bit index of the first bit is lower than the bit index of the second bit, a value of the back-off timer for the first STA is higher than a value of a back-off timer for the second STA, wherein if the bit index of the first bit is higher than the bit index of the second bit, a value of the back-off timer for the first STA is lower than a value of a back-off timer for the second STA;
   acquiring a channel access authority based on at least one slot time, wherein each slot time is a time when a channel is kept in an idle state for a channel access of the first STA;
   transmitting a PS (power save)-poll frame requesting a transmission of the buffered frame for the first STA to an access point (AP); and
   receiving a response frame from the AP in response to the PS-poll frame,
   wherein a length of the each slot time is set to be larger than a transmission time of the PS-poll frame.

2. The method of claim 1, wherein the value of the back-off timer for the first STA is determined based on a time when the first STA sets the back-off timer for the first STA.

3. The method of claim 1, wherein the response frame is the buffered frame for the first STA.

4. The method of claim 1, wherein the response frame is an acknowledgement (ACK) frame.

5. A first STA that operates in a power save mode in a wireless local area network (WLAN) system, the first STA comprising:
   a transceiver that transmits and receives a radio signal; and
   a processor, that controls the transceiver to:
   receive a traffic indication map (TIM) element including a bitmap sequence, wherein the bitmap sequence includes a first bit indicating that a buffered frame for the first STA exists and a second bit indicating that a buffered frame for a second STA exists,
   set a back-off timer for the first STA based on a bit index of the first bit and the second bit, wherein the back-off timer for the first STA is a value of at least one slot time, wherein if the bit index of the first bit is lower than the bit index of the second bit, a value of the back-off timer for the first STA is higher than a value of a back-off timer for the second STA, wherein if the bit index of the first bit is higher than the bit index of the second bit, a value of the back-off timer for the first STA is lower than a value of a back-off timer for the second STA,
   acquire a channel access authority based on at least one slot time, wherein each slot time is a time when a channel is kept in an idle state for a channel access of the first STA,
   transmit a PS (power save) poll frame requesting a transmission of the buffered frame for the first STA to an access point (AP), and
   receive a response frame from the AP in response to the PS-poll frame,
   wherein a length of each slot time is set to be larger than a transmission time of the PS-poll frame.

6. The first STA of claim 5, wherein the value of the back-off timer for the first STA is determined based on a time when the first STA sets the back-off timer for the first STA.

7. The first STA of claim 5, wherein the response frame is the buffered frame for the first STA.

8. The first STA of claim 5, wherein the response frame is an acknowledgement (ACK) frame.

* * * * *